United States Patent [19]
Schiller et al.

[11] Patent Number: 5,109,545
[45] Date of Patent: Apr. 28, 1992

[54] PROXIMAL CABLE-LESS COMMUNICATION SYSTEM WITH INTENTIONAL SIGNAL PATH

[75] Inventors: Thomas H. Schiller, Los Altos, Calif.; Terry L. Fry, Davidsonville, Md.; Richard J. Smith, San Jose, Calif.

[73] Assignee: Rose Communications, Inc., Santa Clara, Calif.

[21] Appl. No.: 477,583

[22] Filed: Feb. 9, 1990

[51] Int. Cl.$^5$ .............................. H04B 1/16
[52] U.S. Cl. ................... 455/208; 455/265; 455/317
[58] Field of Search ............. 455/254, 255, 258, 265, 455/317, 318, 88, 89, 55, 57, 208, 209, 78, 82; 331/2, 46, 47

[56] References Cited

U.S. PATENT DOCUMENTS

| | | | |
|---|---|---|---|
| 3,609,579 | 9/1971 | Chappell et al. | 331/46 |
| 3,641,433 | 2/1972 | Mifflin et al. | 455/79 |
| 3,867,699 | 2/1975 | Stoffer | 455/86 |
| 4,218,655 | 8/1980 | Johnston et al. | 455/39 |
| 4,276,638 | 6/1981 | Andreucci et al. | 370/30 |
| 4,361,906 | 11/1982 | Sakamoto | 455/140 |
| 4,403,343 | 9/1983 | Hamada | 455/134 |
| 4,453,138 | 6/1984 | Scheer | 331/47 |
| 4,521,745 | 6/1985 | Falconer | 331/2 |
| 4,585,903 | 4/1986 | Schiller et al. | 455/343 |
| 4,651,103 | 3/1987 | Grimes | 328/72 |
| 4,759,078 | 7/1988 | Schiller | 455/208 |

FOREIGN PATENT DOCUMENTS 1469419  7/1974  United Kingdom .
2122456B 5/1983  United Kingdom .

Primary Examiner—Curtis Kuntz
Assistant Examiner—Edward Urban
Attorney, Agent, or Firm—Blakely, Sokoloff, Taylor & Zafman

[57] ABSTRACT

An improved proximal cable-less communications system using at least two receivers is described. The system is significantly improved by utilizing an intentional signal path for the local oscillator signal to be radiated while maintaining the architecture of each receiver and the proximal cable-less communications system. The effectiveness of radiation can be increased by extending the length of the electrical interconnect which connects the local oscillator to the mixer. In addition, the effectiveness of radiation is increased by magnetically coupling the electrical interconnect which connects the local oscillator with the mixer with the electrical interconnect which connects the antenna and the mixer. By coupling the two electrical interconnect, the signal output by the local oscillator is induced on the electrical interconnect between the antenna and the mixer. The coupling is set such that the signal induced travels along the electrical interconnect and is radiated out of the antenna.

21 Claims, 19 Drawing Sheets

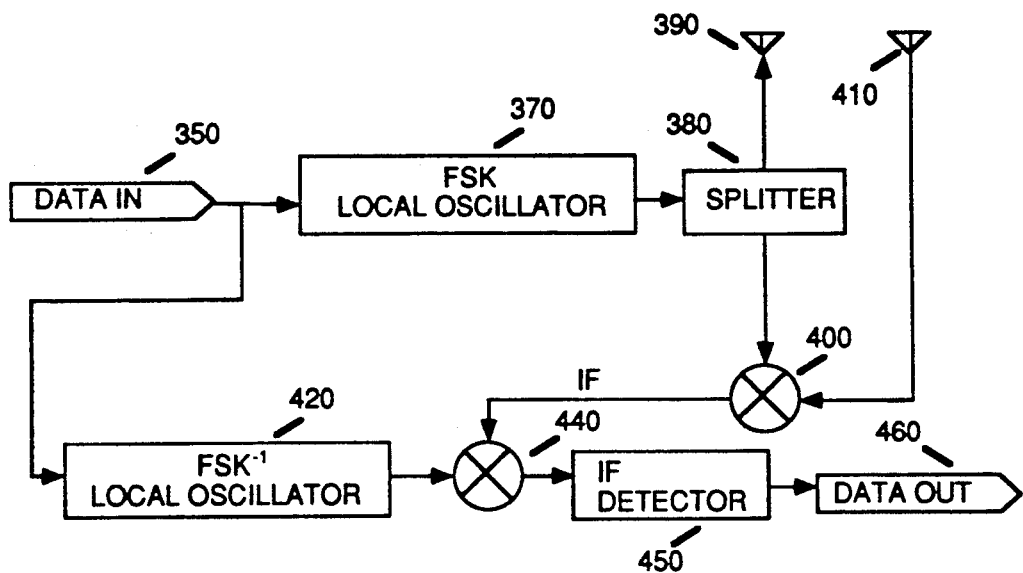
FIG..6
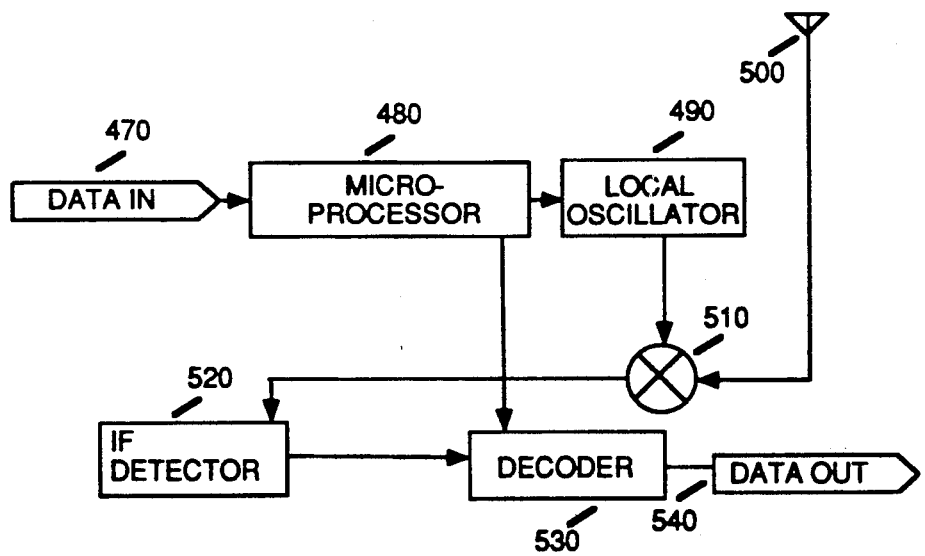
FIG. 7a

PROXIMAL CABLE-LESS COMMUNICATION SYSTEM WITH INTENTIONAL SIGNAL PATH

BACKGROUND OF THE INVENTION

1. FIELD OF THE INVENTION:

The present invention released to the field of proximal cable-less communication systems.

2. RELATED APPLICATIONS

This application is related to U.S. patent application Ser. No. 07/477,680, filed Feb. 9, 1990, entitled "Parametrically Tuned Oscillator", now abandoned. U.S. Pat. No. 5,032,802, entitled "Hybrid Directional Coupler Circuit", U.S. patent application Ser. No. 07/477,632, filed Feb. 9, 1990, entitled "Method and Apparatus for Increased Receiver Sensitivity in a Proximal Cable-less Communication System", U.S. patent application Ser. No. 07/478,220, filed Feb. 9, 1990, entitled "Method and Apparatus for Selective Sideband in a Proximal Cableless Communication System Signal", which are incorporated by reference.

3. ART BACKGROUND:

In the class of short-range (approximately 500 ft.) transceivers, such as cordless telephones or "walkie-talkies", basic super heterodyne techniques are used to receive an incoming signal and mix it with a local oscillator to provide an intermediate frequency (IF). The IF is detected and the resulting signal, such as voice, is amplified for end use. In transmission, the same transceiver unit accepts an input, such as voice, and modulates a carrier frequency. The resulting modulation envelope is amplified in the power amplifier for transmission.

Transmission of signals between two short-range transceivers still requires communication over a distance. To provide signal transfer across this distance, a nominal power level is required for transmission of intelligence. Such transmission would require a similar circuit as described above. When the distance is much shorter, communication may be achieved over lines or cable. Such direct physical connections are used because of simplicity and cost savings. However, physical connections significantly restrict the mobility of the users of the transceivers.

In U.S. Pat. No. 4,759,078, a proximal cable-less communications system using two receivers is described. A local oscillator of the first receiver is modulated to convey intelligence to a second receiver through the leakage radiation from the first local oscillator. Similarly, the local oscillator of the second receiver may also be modulated whereby the first receiver detects the leakage radiation from the local oscillator of the second receiver. The intermediate frequencies of the two receivers are set to frequencies such that the local oscillators provide the input signals to a mixer which generates signals at the intermediate frequency from which information is extracted. By proximately disposing the two receivers to each other, two-way transfer of information is achieved.

Using this approach, two way communication is achieved within a limited range without the need for complicated circuitry to provide the transmission of signals. Further, it permits a significant increase in user mobility.

This system is described by referring to the diagram of FIG. 1. Two way communication is achieved by tuning local oscillator (LO) 11 to a first frequency and LO 21 to a second frequency. Antenna 23 is tuned to receive the LO 11 frequency and antenna 13 is tuned to receive the LO 21 frequency. The intermediate frequency (IF) for both units 10 and 20 are determined by the difference of the frequencies of the two LOs, 11 and 21. The frequencies of the LOs 11 and 21 are set so that their difference is equal to the IF of both receiving systems.

Because of the proximity of the receivers to each other, antennae 13 and 23 are capable of receiving radiation from opposing LOs 21 and 11, respectively. Therefore, antenna 23 receives the first frequency radiation of LO 11 and mixes the signal with the second frequency from LO 21 in mixer 22 to provide an IF to Block 24. Correspondingly, antenna 13 receives the second frequency radiation from LO 21 and mixes the signal with the first frequency radiation from LO 11 in mixer 12 to provide the IF to block 14. By providing intelligence through the modulation of LO 11 and 21 signals, communication may be achieved between the units 10 and 20.

This system is inherently limited to modest power levels, namely the available local oscillator power, which clearly dictates the proximal range for the system. Furthermore, this system lends itself to applications inside buildings, as opposed to outdoor applications. As such, the performance is affected by the confines and obstructions within the building. For example, the propagation model for outside implementation might be close to free space or $1/r^2$ (where r is the radial distance), whereas in-building proximal systems may have a propagation model as restrictive as $1/r^4$. Thus, given the same source power, the effectiveness of the system may suffer a 30 dB loss at an approximate frequency of 1500 MHz over a 30 meter range. This loss of effectiveness is even more evident at UHF and higher, where path loss is more significant.

In addition, when the modulator (e.g., modulator 16 in receiver 10 of FIG. 1) is operating, and modulating the local oscillator (e.g. LO 11), and an incoming signal is detected, the signal received which is mixed with the modulated signal output by the local oscillator is somewhat distorted or contaminated by the modulation imposed on the oscillator. This distortion is referred to as sidetone. Although this feature is not always a problem, it is a hindrance when implementing digital systems and analog systems where sidetone is undesired, such as when the sidetone is significant to affect the value of the output information.

Summary of the Invention

It is therefore an object of the present invention to present an improved proximal cable-less communications system which has little or no sidetone.

Furthermore, it is an object of the present invention to provide a proximal cable-less communications system which effectively radiates the minimal local oscillator signal.

It is an object of the present invention to provide a proximal cable-less communication system which allows a more selective and sensitive receiver to be implemented to enhance the performance of the system.

An improved proximal cable-less communications system using at least two receivers is described. The system is significantly improved by utilizing an intentional signal path for the local oscillator signal to be radiated while maintaining the architecture of each receiver and the proximal cable-less communications system. The receiver performance is also improved by including a preselection filter to eliminate extraneous signals, particularly signals at the image frequency of the mixer. In addition, an amplifier is utilized to further enhance the signal resulting in a more selective and sensitive receiver.

Furthermore, in the improved proximal cable-less communication system of the present invention, sidetone is eliminated through the use of components, placed after mixer which generates signals at the intermediate frequency and prior to detection device of the information encoded in the signals at the intermediate frequency, which cancel out the effect of those signals containing information derived from the modulation of the local oscillator of each receiver of proximal cable-less communication system of the present invention.

BRIEF DESCRIPTION OF THE DRAWINGS

The objects, features and advantages of the present invention will be apparent from the following detailed description of the invention in which:

FIG. 6 is a block diagram of another embodiment of the improved proximal cable-less communication system of the present invention employing frequency shift keying (FSK) circuitry to eliminate sidetone.

FIGS. 7a and 7b are block diagrams of still another embodiment of the improved proximal cable-less communication system of the present invention which employs a processor to perform intelligent synchronization of the modulation of the local oscillator and the receipt of a modulated signal from a second receiver.

DETAILED DESCRIPTION OF THE PREFERRED EMBODIMENT

An improved proximal cable-less communication system is herein described. Referring to FIG. 2, the receiver device maintains the primary function of its local oscillator to provide a signal having a predetermined frequency into the mixer and utilizes an intentional signal path to improve the receiver's secondary function, incidental to the primary function of the local oscillator of the receiver, to more effectively radiate the information to be conveyed by the receiving device through the leakage radiation which emanates from the local oscillator within the receiver.

Figure 1:
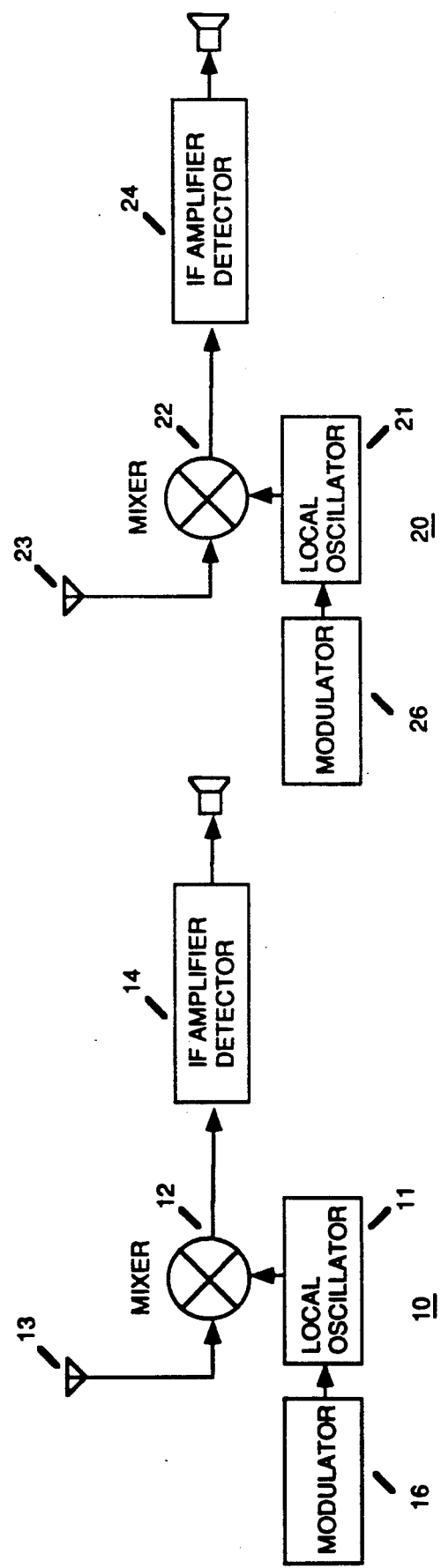
FIG. 1 is a block diagram of the prior art proximal cable-less communication system.
Figure 2A:
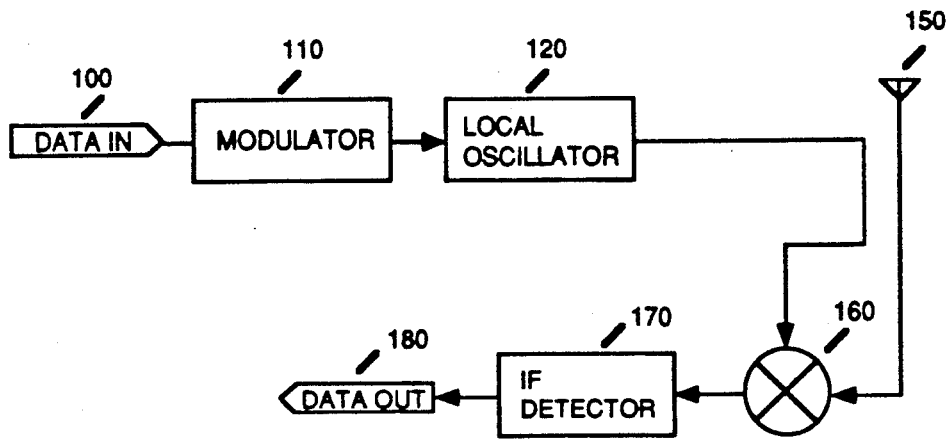
FIGS. 2a, 2b and 2c are block diagrams of the improved proximal cable-less communication system of the present invention which utilizes an intentional signal path while maintaining the architecture of the proximal cable-less communications system.

FIG. 2a shows a first embodiment in which the local oscillator 120 is input to mixer 160 to provide a signal at first a predetermined frequency into the mixer 160. A signal at a second predetermined frequency is received by antenna 150 and is input to mixer 160. The received signal is a modulated signal preferably radiated by a second receiver, similarly configured, the modulation of the signal conveying information which is subsequently decoded as the output of the receiver. The mixer 160 generates a signal at the frequency which is the sum of the frequencies of the two input signals ("the sum frequency") and at the frequency which is the difference of the frequencies of the two input signals ("the difference frequency"). The difference frequency, referred to as the intermediate frequency (IF), is passed through as an intermediate frequency detector which detects the modulation of the signal originating from the modulated received signal and produces the data output 180. In addition to providing the signal that is mixed with the received signal to generate the intermediate frequency signal, local oscillator 120 may also be used to communicate information through modulation of the signal generated by local oscillator 120.

To cause a more effective radiation of the signal generated by local oscillator 120 without affecting the signal input to mixer 160, an intentional signal path is used to promote radiation of the local oscillator signal. In the embodiment represented by FIG. 2a. A first electrical interconnect (e.g. signal line or signal wire) which connects the local oscillator 120 and mixer 160 is intentionally routed to lie parallel with and in close proximity to a second electrical interconnect which connects the antenna 150 and mixer 160. The length the two electrical interconnect are parallel and the distance the two electrical interconnect are separated must be sufficient that a signal on the first electrical interconnect is imposed on the second electrical through inductive coupling of the two electrical interconnect. Preferably the minimum length the electrical interconnect are parallel is approximately equal to one-tenth of the wave length. For example, at a frequency of 2.4 GHz, it is preferred that the electrical interconnect are parallel for approximately 0.5 inches. The spacing between the electrical interconnect should be as small as possible. For example, the spacing should be 0.1 inches. Thus, the primary function of the local oscillator—to provide a signal into the mixer 160—is maintained and the modulated signal output by local oscillator 120 is more effectively radiated by radiating the signal through antenna 150 via the inductive coupling between the electrical interconnect connecting local oscillator 120 to mixer 160 and antenna 150 to local oscillator 160.

Figure 2B:
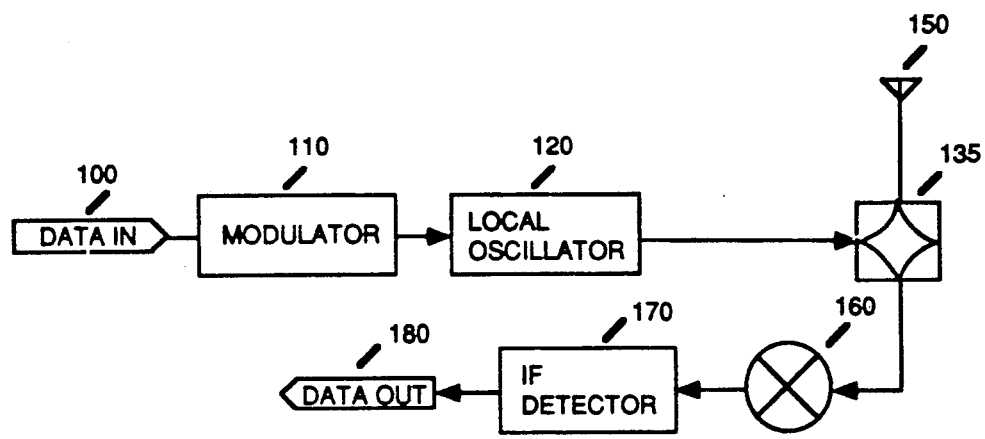

The length of the first electrical interconnect can also be increased to further provide opportunity for the signal output by local oscillator 120 to radiate by providing additional electrical interconnect for the signal to leak from. FIG. 2b illustrates another embodiment of the present invention which more effectively radiates the leakage radiation of the local oscillator 120 using an intentional signal path that accentuates the leakage radiation of the signal output by local oscillator 120 while providing its primary function, that of providing an oscillating signal at a predetermined frequency to mixer 160.

In this embodiment, the signal generated by local oscillator 120 is input to a hybrid directional coupler 135 which couples the signal input by local oscillator 120, directing the signal to mixer 160 and to antenna 150. Furthermore, the hybrid directional coupler couples the signal received through antenna 150 to the mixer 160 with the minimum of power loss. The hybrid directional coupler is described in U.S. Pat. No. 5,032,802, entitled "Hybrid Directional Coupler".

Figure 2C:
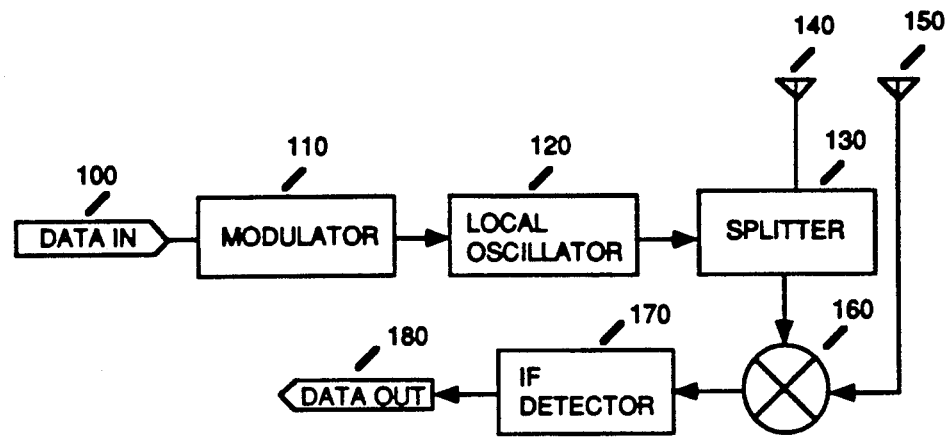

Another embodiment is illustrated by FIG. 2c. FIG. 2c shows a system in which the data in 100 is input to modulator 110, which modulates local oscillator 120 thereby encoding the data in 100 on the signal output by local oscillator 120. The signal output by local oscillator 120 is used as one of the inputs to mixer 160. The second input to mixer 160 is the signal detected and received by antenna 150. The mixer generates an intermediate frequency containing data encoded on the signal received through antenna 150. The encoded information is detected by IF detector 170 to generate the data output 180. Local oscillator 120 is also used to radiate information encoded on the oscillating signal by modulator 110 through its leakage radiation. Rather than letting the leakage radiation be radiated in a undirected manner, the radiation is effectively directed to splitter 130, which splits the signal between the mixer 160 and a second antenna 140. Antenna 140 is separate from the receiving antenna 150 and radiates the modulated signal information generated by local oscillator 120 thereby increasing the effectiveness of the radiation while maintaining the architecture of the receiver device and the primary function of the local oscillator.

By using an intentional signal path through a separate antenna, flexibility in the arrangement of the antennae is provided to maximize efficiency reception and radiation of signals into the receiver of the present invention. Specifically, by using a two antenna configuration, the antennae can be arranged to maximize the discrimination ability of the receiving antenna and maximize the radiating efficiency of the radiating antenna (and therefore the local oscillator). In the receiver of the present invention, the capability to more effectively discriminate all signals except the intended received signal becomes critical because of the increase effectiveness of radiation of the local oscillator signal. The increase in the radiation efficiency of the local oscillator will, as a consequence, also increase the interference of the local oscillator's signal on the signals detected at the receiving antenna. This undesirable effect is referred to as front end overload. The antennae can be placed physically apart from one another to decrease the effect the signal intentionally radiated through the first antenna (e.g. antenna 140, FIG. 2c) has on the signals received through the receiving antenna (antenna 150, FIG. 2c).

Preferably the antennae are spaced a minimum distance approximately equal to one-half of the local oscillator signal wave length. For example, at a signal frequency of 2.4 GHz, the antennae are preferably spaced apart a minimum distance of 2.5 inches.

The front end overload may also be decreased by having the receiving antenna at a polarization different from the polarization of the radiating antenna. It has been found that, on the average, a 20 dB discrimination occurs between antennae of different polarization. The receiving antenna can, for example, be horizontally polarized and the radiating antenna can be vertically polarized whereby the front end overload induced by the signals radiated by the radiating antenna are attenuated by 20 dB.

The two antennae may be of different size and lengths in order to optimize each antenna's function. For example, a relatively short antenna can be used to receive signals, because it is not used to radiate signals but only receive signals, while a relatively long antenna is used to radiate signals such that there is less loading on the antenna resulting in a more efficient radiator.

In another implementation which utilizes two antennae, the two antennae are established in a colinear arrangement (end to end). This creates a wave pattern such that interference of signals received and radiated is minimal because the two antennae lie in each other's radiation minima.

Furthermore, by using a two-antenna receiver of the present invention, each antenna can be highly tuned to the frequency each is to receive or radiate. The antennae are more efficient in their functions because th bandwidth of signals to which each antenna is tuned is narrow and the receiver antenna discriminates against frequencies except the known receiving frequency. The receiver antenna therefore discriminates against the signals at the frequency generated by the local oscillator of the receiver, thereby reducing the front end overload.

Figure 3:
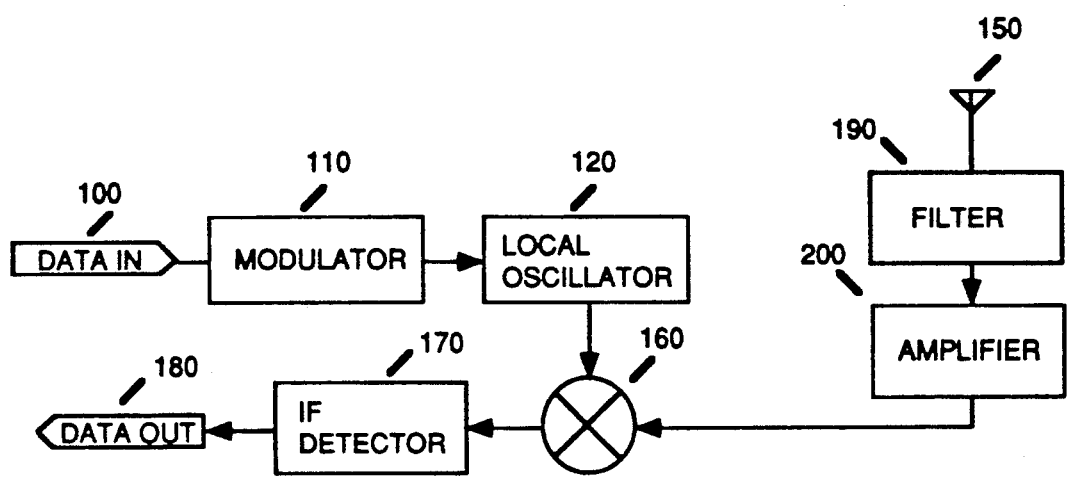
FIG. 3 is a block diagram of the improved proximal cable-less communication system of the present invention which improves receiver performance a preselection filter and amplifier to provide a more effective receiver.

Referring to FIG. 3, another improvement to the proximal cableless communications system is described. As described above, the antenna 150 receives leakage radiation from the local oscillator of a second receiver device, similarly configured, wherein the local oscillator is modulated according to the data input to the second receiver device.

The intermediate frequency is increased to provide a greater separation of the frequencies of the local oscillators of the receiver devices such that frequency preselection is achieved using simple, low cost components. In addition, a filter and an amplifier are used to provide that only the intended received signal is processed through the receiver, thereby eliminating extraneous signals which can cause corruption of the signal and the final information output.

In the system of the present invention, a more selective and sensitive receiver is provided. The intermediate frequency is increased to provide a greater separation between the frequencies of the signals generated by the local oscillators of the receiver devices. By providing a greater margin, the signal processing process is simplified and simpler low cost components may be employed to process the signal because the margin for error is increased. For example, it is preferred that a 50 MHz separation is provided between local oscillator frequencies in the range of 2000-3000 MHz.

The signal received by antenna 150 is input to a filter 190 which filters out frequencies which do not contain the information radiated from a second receiver device. The signal is then input to amplifier 200, which amplifies the signal and provides for increased sensitivity of the signal by the IF detector 170. The filter 190 acts as a signal preselection device. This filter can be defined according to application. For example, if the local oscillator is below the frequency of the desired receiving frequency, the filter may be defined to be a high pass filter, thereby eliminating the low frequency signals from the local oscillator. Preferably the filter is a band pass filter designed to center around the frequency of the received signal, that is, the frequency of the local oscillator of the second receiver device.

By designing the filter to center around the receiving frequency and increasing the intermediate frequency, a simple, low cost, but accurate preselection device is provided which attenuates the undesired signals, including the signals generated by the local oscillator of the same receiver. The filter also attenuates those signals at the image frequency of the intermediate frequency. The mixer generates signals at the frequencies which are the sum and difference of the input frequencies. The difference frequency is the intermediate frequency. However, for any given input frequency there are two frequencies which, if input to a mixer with the given input frequency, generates the intermediate frequency. For example, if the received signal is at a frequency of 2400 MHz and the local oscillator in the receiver generates a signal at a frequency of 2450 MHz, the sum frequency output by the mixer would be 4850 MHz and difference frequency, that is, the intermediate frequency, would be a frequency of 50 MHz. However, for a local oscillator having a local oscillating frequency of 2450 MHz, a signal at a receiving frequency of 2500 MHz will also cause the mixer to generate an intermediate frequency of 50 MHz. This frequency is referred to as the image frequency.

Figure 4:
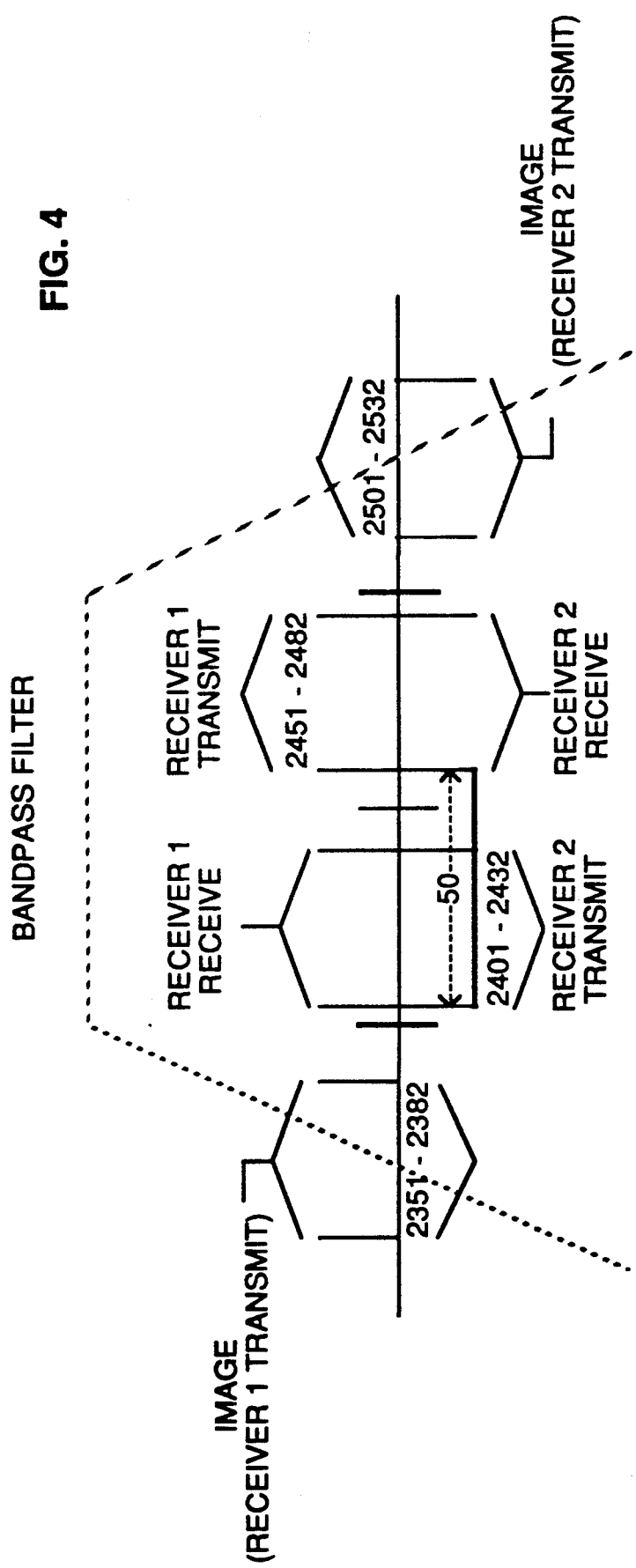
FIG. 4 illustrates an example of the frequency spectrum of the preselection filter employed in the second embodiment of the present invention.

An exemplary filter function is represented by FIG. 4. In the present example, the local oscillator of a first receiver constructed according to the receiver of the present invention is tuned to a frequency in the range of 2451-2482 MHz to receive signals in the range of 2401-2432 MHz. The local oscillator of a second receiver also constructed according to the receiver of the present invention is tuned to a frequency in the range of 2401-2432 MHz to receive signals in the range of 2451-2482 MHz. Thus, the intermediate or difference frequency occurring at the output of the mixer is 50 MHz. The bandpass filter shown is designed to be used in both receivers; therefore the filter has a bandwidth wide enough to pass signals at the frequencies the local oscillators of the receivers are tuned to, but narrow enough to attenuate extraneous signals such as signals at the image frequencies. Similarly the bandpass filter can be designed to a narrower bandwidth such that the passband centers around the receive frequency only, thereby attenuating signals at the frequency of the local oscillator of the same receiver.

By using the preselection filter 190 (FIG. 3), the influence of the local oscillator of the receiving device, which is most often a stronger signal than the signal originating from the local oscillator of the second receiver device and received through antenna 150, is greatly reduced. The preselection filter 190 enhances signal image rejection in the receiver and lessens the possibility of densensitization of the mixer 160 caused by the presence of radiation from the local oscillator 120 (front end overload). In addition, the amplifier 200 amplifies the incoming signal to provide a stronger signal into mixer 160, thereby increasing the sensitivity of the receiver and improving the performance of the communications link between two receiver devices constructed according to the architecture of the proximal cable-less communication system of the present invention.

Figure 5:
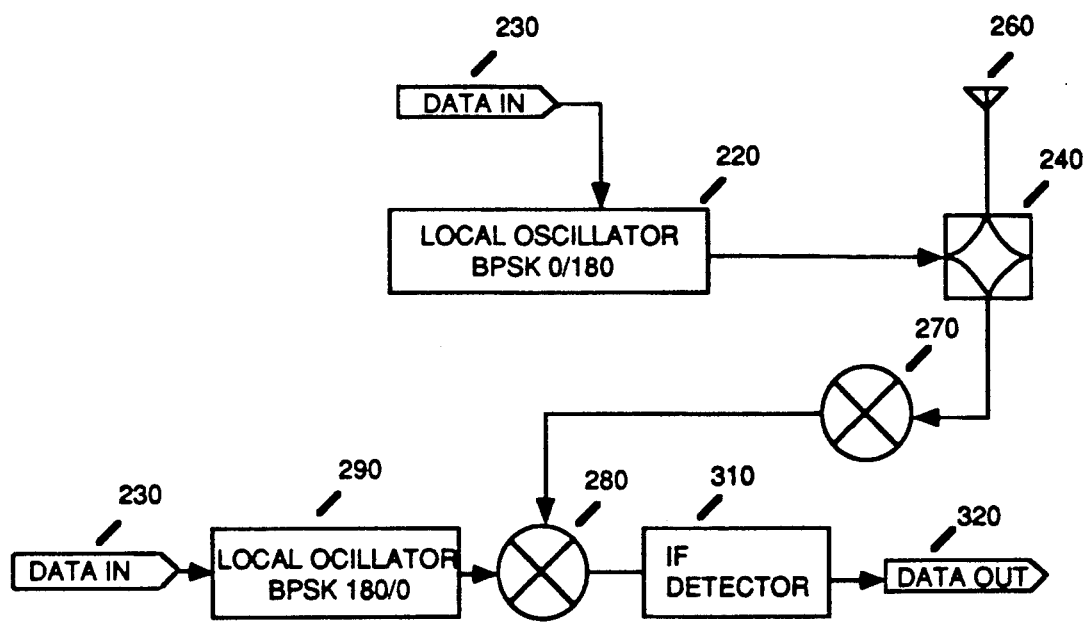
FIG. 5 is a block diagram of another embodiment of the improved proximal cable-less communication system of the present invention which employs binary phase shift keying (BPSK) to eliminate sidetone.

As discussed earlier, when operating the proximal cable-less communications system in duplex mode (i.e. when modulating the local oscillator and receiving signals through the antenna concurrently) sidetone is produced. In digital systems this is undesirable because the sidetone may corrupt the signal significantly to change the state of the digital output, for example, from a value of 0 to a value of 1. Another improvement of the system of the present invention is the elimination of sidetone in full duplex proximal cable-less communication systems. In the receiver device as shown in FIG. 5, a binary phase shift keying (BPSK) circuit 220 comprising a local oscillator is configured to shift the oscillating signal according to the data input which functions as a control signal. For example, the BPSK 220 circuit can be configured to shift the oscillating signal by 180 degrees if the data input is a value of 1 and by 0 degrees (i.e. not shift the phase of the signal) if the data input is a value of 0. According to the control signal input, the BPSK circuit to 220 will perform a phase shift accordingly to encode intelligence into the local oscillating signal.

The output of the BPSK circuit 220 is input to a network 240, which splits the signal and outputs the signal to antenna to 260 for radiation and subsequent detection by a second receiver device similarly configured. Network 260 also outputs the signal to mixer 270 for use in detecting data received through the signals received by antenna 260. Preferably, the signal is a hybrid directional coupler as shown in FIG. 5. In the present illustration a double frequency conversion circuit is utilized to adjust the final intermediate frequency to a frequency acceptable to IF amplifier-detector 310. In a double conversion circuit the signal received is processed through two mixers. The first mixer 270 performs the mixing function to generate a first intermediate frequency (IF) which is input to a second mixer 280. The data input 230 is also input to a second BPSK circuit 290, which comprises a local oscillator generating a second oscillating signal at a different same frequency as the local oscillator in BPSK circuit 220. BPSK circuit 290 shifts the phase of the local oscillating signal opposite to the phase shift generated by BPSK circuit 220. The second BPSK circuit 290 is configured to function in opposition to the first BPSK circuit 220 such that out the modulated local oscillating signal generated by local oscillator 210 is cancelled out in mixer 280.

For example, in the present illustration, the second BPSK circuit will be configured to shift the input oscillating signal by 180 degrees when the data input is the value of 0, and shift the input oscillating signal by 0 degrees when the data input value is 1. When the signal output by the first mixer 220 is mixed, via the second mixer 280, with the output of the second BPSK circuit 290, the output by BPSK circuit 290 cancels out the portion of the signal contributed by BPSK circuit 220 and local oscillator 210, which is considered to be sidetone. Consequently, the signal input to IF detector 310 is a clean signal without sidetone the data output therefrom (320) and can be easily detected.

Another method for sidetone correction is described with reference to FIG. 6. Although this embodiment is described utilizing a two-antenna system, the system is not limited as such and can also operate using a single antenna. The data in 350 is used to control a frequency shift key circuit (FSK) 370 which causes the oscillating signal output by the local oscillator contained in the circuit to be shifted in frequency according to the data input 350 values. For example, when the data input value is equal to zero there is no shift in frequency and when the data input value is the value of 1 the frequency is shifted by a predetermined amount. The output of FSK circuit 370 is input to a signal splitter 380 which outputs the modulated signal to antenna 390 for radiation and to mixer 400. Mixer 400 also receives as input those signals detected and received by antenna 410. The output of the mixer 400 is a first intermediate frequency signal which is a combination of the modulated signal output by FSK circuit 370 and the signal detected and received by antenna 410. To eliminate the sidetone caused by the modulation of local oscillator 360, the same data input 350 is input to an inverted frequency shift keying circuit (FSK$^{-1}$) 420. FSK$^{-1}$ circuit 420 modulates a local oscillator contained therein, which operates at the same frequency as the local oscillator contained in FSK circuit 370 and causes the frequency of the signal output to be shifted the same amount as the signal output by FSK circuit 370 in the opposite direction according to the data input 350.

In the present example FSK circuit 420 would modulate the local oscillator to produce a signal which shifts the oscillating signal by the same amount as FSK circuit 370, but in the opposite direction. This modulated signal output by FSK$^{-1}$ circuit 420 is input to mixer 440 which produces the intermediate frequency signal without sidetone because the modulated signal generated through FSK circuit 370 is substantially cancelled out by the modulated signal generated through FSK$^{-1}$ circuit 420 (the FSK$^{-1}$ circuit 420 may not cause complete cancellation of the sidetone of the signal generated by FSK circuit 370 due to slight inaccuracies in circuit construction). The signal output from the mixer 440 is then input to an intermediate frequency detector which detects the intelligence encoded therein and outputs the data 460.

Another embodiment for the elimination of sidetone is illustrated by the block diagram of FIG. 7a. In this method, cancellation of the sidetone is achieved through a digital system which utilizes a microprocessor device and a decoder and the implementation of an intelligent connection between the sourcing microprocessor and the local decoder. The system described herein is digital in operation. Although not shown by the following figures, the data input to the microprocessor is in a digital (preferably binary) format. Therefore, any analog data input, for example voice, must be first converted from analog format to a digital format. This may be achieved by a widely available analog to digital (A/D) converter. Similarly, if the final data output is to be in the format of analog signals, the data output from the decoder must be input to a digital to analog (D/A) converter to convert the output from digital format to analog format.

Referring to FIG. 7a, the data input 470 is input to microprocessor 480, which performs two primary functions. One function of the microprocessor 480 is to send the intended output data to local oscillator 490, where the local oscillator is modulated by the data and, in turn, radiated for reception by a second receiving device through the leakage radiation of the local oscillator. Data encoded on signals radiated by the second receiver device are received through antenna 500 and input to mixer 510, which mixes the received signals with the signal output by local oscillator 490. This produces intermediate frequency signals containing information encoded by the second receiver. If the local oscillator 490 is modulated at the same time as the local oscillator in this second receiver, the output data encoded by the signals radiated by the second receiver, received through antenna 500 and, input to mixer 510, will be corrupted, unless the output of mixer 510 is corrected to compensate for the concurrent modulation of local oscillator 490. This is performed by timing the transfer of the input data 470 from microprocessor 480 to decoder 530, either by microprocessor 480, or through external delay circuits, to arrive at the decoder 530 at the same time as the corresponding information from IF detector 520 arrives which comprises detected signals received from a second receiver device through antenna 500 as mixed with the signals generated by local oscillator 490 modulated by the data input 470. The decoder decodes the information received from the IF detector 520 and, using the information received from microprocessor 480, cancels out the effect, if any, caused by the modulation of local oscillator 490 through binary logic operations. The desired data from the second receiver is output as the data output 540.

Figure 7B:
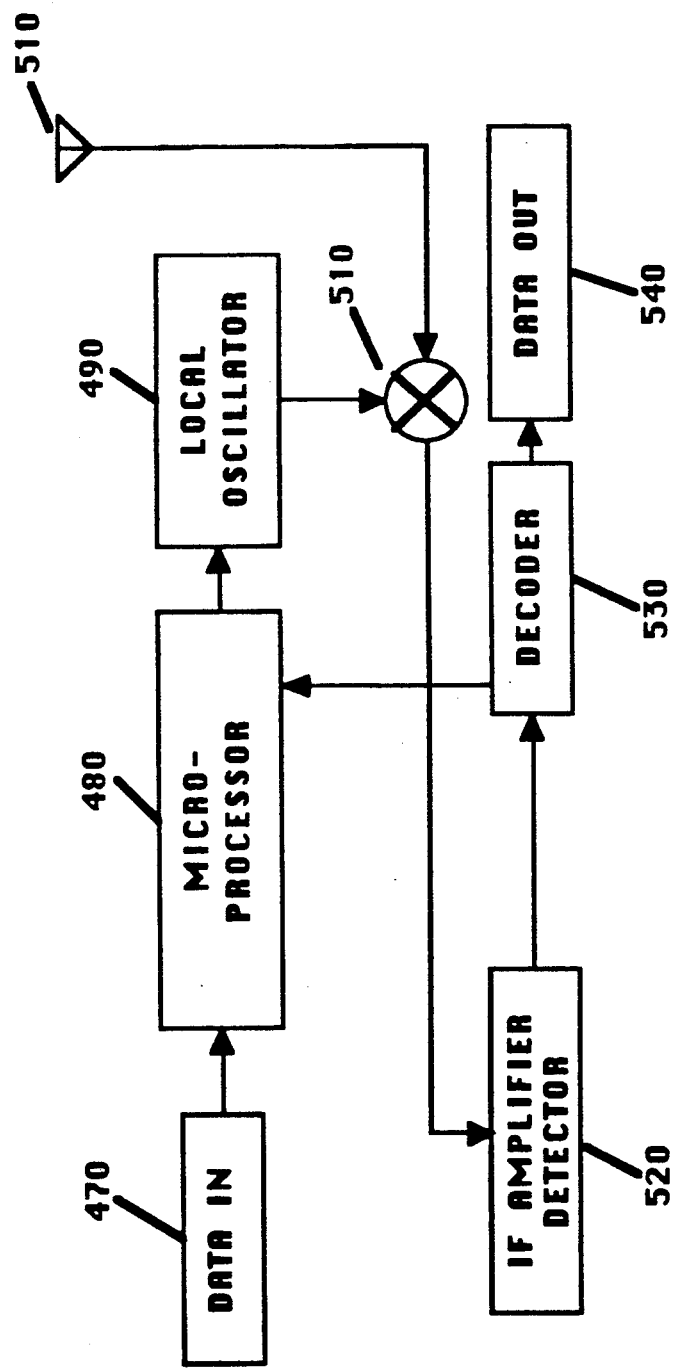

Still another embodiment for the elimination of sidetone is illustrated by block diagram FIG. 7b. It should be noted that the main difference between FIG. 7a and FIG. 7b is the direction of data flow between the microprocessor 480 and decoder 530. In this method, intelligent synchronization is achieved between the data encoded and output through the leakage radiation of local oscillator 490 and the data encoded on signals received by the antenna 500, such that data encoded and radiated through the local oscillator 490 does not corrupt the data received through 500 into the receiver. Referring to FIG. 7b, the data input 470 is input to microprocessor 480 which constructs a packet of digitized information and timing bits, and periodically outputs this package to modulate the local oscillator 490. The local oscillator 490 is, therefore, modulated by a packet formed by microprocessor 480 and, through the leakage radiation of local oscillator 490, the encoded information is radiated for receipt by a second receiving device. Data encoded on signals radiated by the second receiver are received through antenna 500 and input to mixer 510, which mixes the received signals with the signal output by local oscillator 490. This produces signals at the intermediate frequency containing a packet of information encoded by the second receiver. If the local oscillator 490 is modulated at the same time as the local oscillator in the second receiver, the resulting output data 540 determined from signals radiated by the second receiver device and received through antenna 500 and mixer 510 will be corrupted. By implementing the intelligent construction of packets, this will be avoided. Each packet constructed by microprocesor 480 will remain unsent to local oscillator 490 until a signal has been received from the decoder indicating that reception of the incoming data from the second receiving device is complete. At this time, the information in microprocessor 480 will be sent to local oscillator 490 where the signal will be modulated and radiated through leakage radiation to the second receiver. The second receiver, equipped in a like manner, will decode the incoming information from the first receiver, recognize that reception of the incoming data is complete and release the next packet to its local oscillator for radiation to the first receiver. By synchronizing the receiving devices in such a manner, the incoming data will not be corrupted by the local oscillator of the receiver. In operation, this particular implementation will occupy twice the actual signal bandwidth given a similar data range and a full-duplex system, since each signal is unmodulated for half the time during the time it is receiving and not being modulated, but still radiating. Therefore, in order to maintain a predetermined data rate, it is necessary to send the data at twice the data rate.

In another implementation, the receivers are tuned to receive and transmit on baseband and subcarrier whereby the signals received and radiated do not interfere with one another. This is described with reference to FIG. 8.

Figure 8:
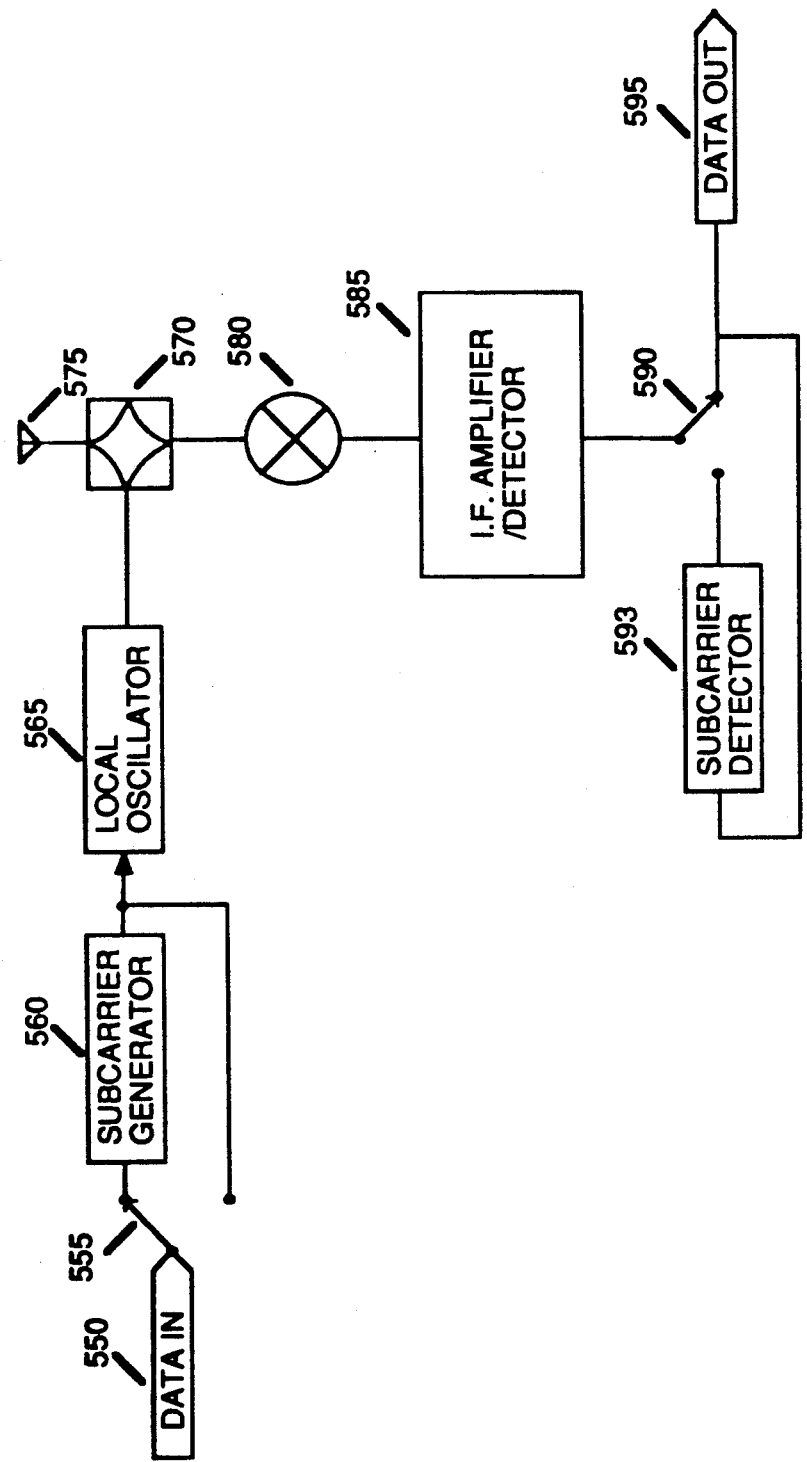
FIG. 8 is a block diagram of another embodiment of the improved proximal cable-less communication system of the present invention which eliminates sidetone through the synchronization of baseband and sideband signal generation and reception.

The receiver is configured to operate in one of two modes. The receiver may be configured to encode information into the subcarrier and receive information encoded in the baseband, or vice versa. The configuration is controlled by placement of the switches 555 and 590. As shown in FIG. 8, the input (such as voice) is input to a subcarrier generator 560 which is then input to local oscillator 565 to encode the input information into the subcarrier of the signal generated by the local oscillator 565. The output of the local oscillator 565 is input to network 570 which directs the signal to antenna 575 for radiation and to mixer 580.

A signal received through antenna 575 is input through the network 570 to mixer 580. The output of the mixer 580, those signals at the intermediate frequency, are input to IF amplifier/detector 585. Switch 590 controls the direction of the output of IF amplifier/detector 585. If the information received through antenna 575 was encoded into the baseband, the outer part of IF amplifier/detector 585 is connected, via switch 590, to the output 595. If the information received through antenna 575 was encoded into the subcarrier, the output of IF amplifier/detector 585 is connected to subcarrier detector 593 which detects the information encoded into the subcarrier and outputs it to the output 595.

Thus, the information received, for example, encoded on the subcarrier and the information radiated, for example, encoded into the baseband, do not interfere with one another and data corruption due to the existence of a modulated local oscillator (sidetone) is avoided.

As will be apparent to one skilled in the art by reading this description, the numerous embodiments herewith described may be used singly to improve a proximal cable-less communication system or may be used in combination with one another. This is illustrated by the following systems described.

A number of embodiments employing the techniques described herein are illustrated by FIGS. 9-13. In one embodiment, referring to FIG. 9a, data input 600 modulates local oscillator 610 through a frequency synthesizer circuit 620 comprising frequency prescaler 630, frequency synthesizer 640 and amplifier 650. The prescaler 630 scales or divides down the frequency of the signal output by local oscillator 610 to a frequency acceptable to the frequency synthesizer 640. The frequency synthesizer 640 samples the frequency of the signal, compares the frequency to the ideal frequency, as indicated by the tune command input 645, and outputs a control signal which is amplified by amplifier 650 and input to local oscillator 610 to adjust the frequency of the local oscillating signal.

The local oscillator used is a variable frequency oscillator. Although any variable frequency oscillator may be used, it is preferred that a parametrically tuned oscillator be used. This is described in patent application U.S. Ser. No. 07/477,680, filed Feb. 9, 1990, entitled "Parametrically Tuned Oscillator", now abandoned.

The modulated signal is output to an attenuator 670, amplifier 680, frequency multiplier 690 and amplifier 700. The frequency multiplier is used to increase the frequency to the frequency needed to be input to the mixer 710 such that the desired IF is generated at the output of the mixer. The frequency multiplier is illustrated as a frequency doubler, but may be a tripler or other value multiplier depending upon the application.

The output of amplifier 700 is input to a hybrid directional coupler 715 which directs the modulated oscillating signal generated out to antenna 720. The hybrid directional coupler 715 also causes the signal to be input to band pass filter 730, amplifier 740 and mixer 710. The mixer 710 is an unbalanced mixer which mixes the signal with the signals detected and received through antenna 720. The signals received by antenna 720 comprise the signals radiated by a second receiver device constructed according to the proximal cable-less communication system of the present invention which is in close proximity to the present receiver device. The signals received by antenna 720 are then input to a filter 730 to eliminate those frequencies that do not contain the information radiated from the second receiver device. In the present embodiment, the band pass filter 730 is designed to also pass the signal generated by local oscillator 610.

The intermediate frequency is set to a frequency high enough such that a simpler low cost filter may be used and the accuracy of the system maintained. The signals are then processed through an amplifier 740 which amplifies the signals, thereby increasing the sensitivity of the receiver.

The output of mixer 710 is input to a second portion of a double conversion circuit to extract the information radiated by the second receiver device. The signal output by mixer 710 is first input to a filter 750 which eliminates all but the signals operating at the intermediate frequency, which is the difference frequency of the frequency of the local oscillator 610 and the frequency of the signal radiated by the second receiver device input to the mixer.

The signals output by filter 750 are input to an amplifier 760 and to a second mixer 770 which mixes the signal with a signal generated by local oscillator 780. The second mixer 770 is used to bring the signal frequency down to a level acceptable to the IF amplifier/detector 800. The output of mixer 770 is input through an IF filter 790 to filter all signals but those at the second intermediate frequency into an IF amplifier/detector which detects the modulation of signals at the second intermediate frequency, which are representative of the signal radiated by the second receiver device. The output of the amplitude detector is input to a simple comparator circuit 820 which generates a 1 or 0 depending upon the value output by the detector 800. This results as the data output 830 communicated by the second receiver device.

Figure 9A:
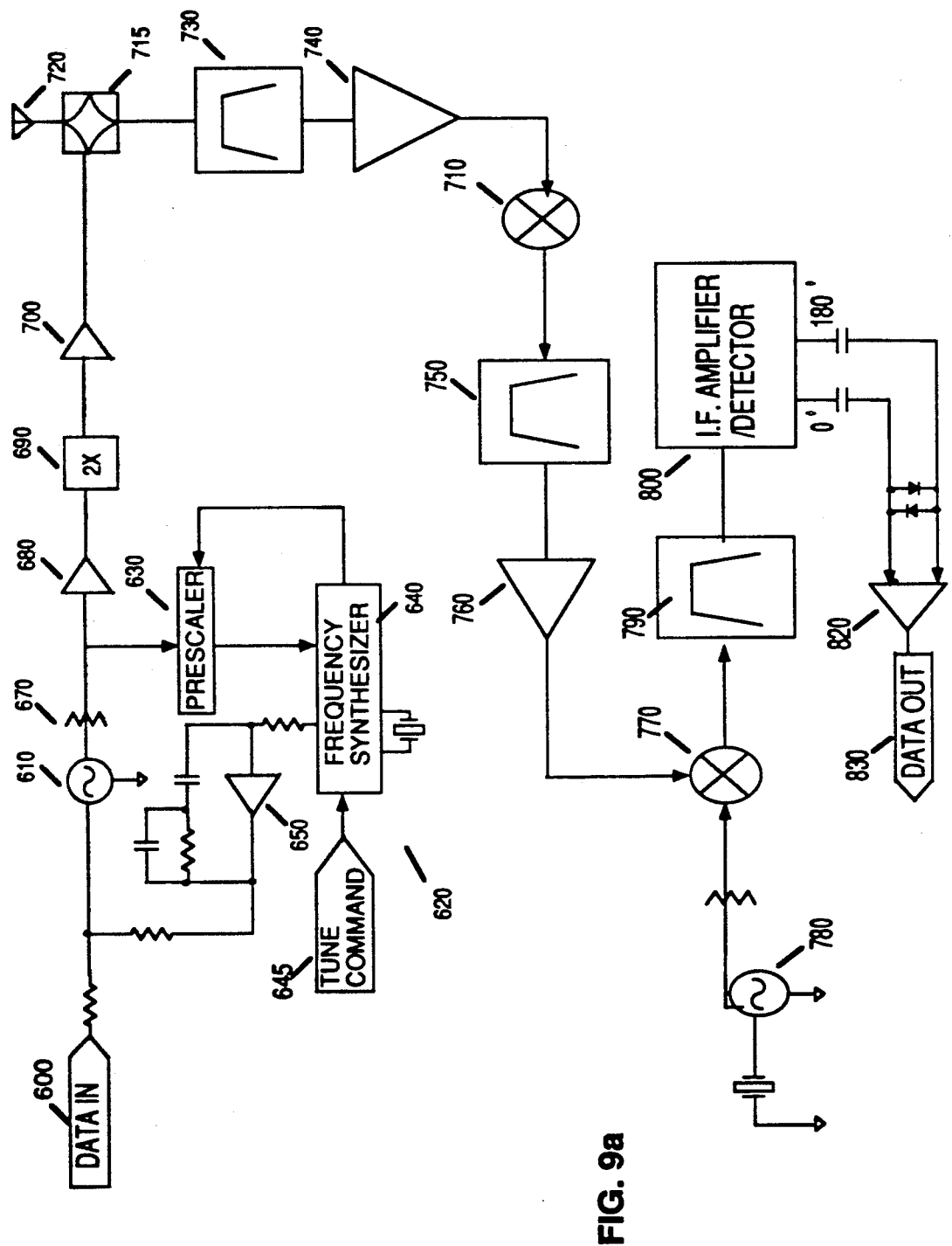
FIGS. 9a, 9b and 9c illustrate a first exemplary improved proximal cable-less communication system of the present invention.
Figure 9B:
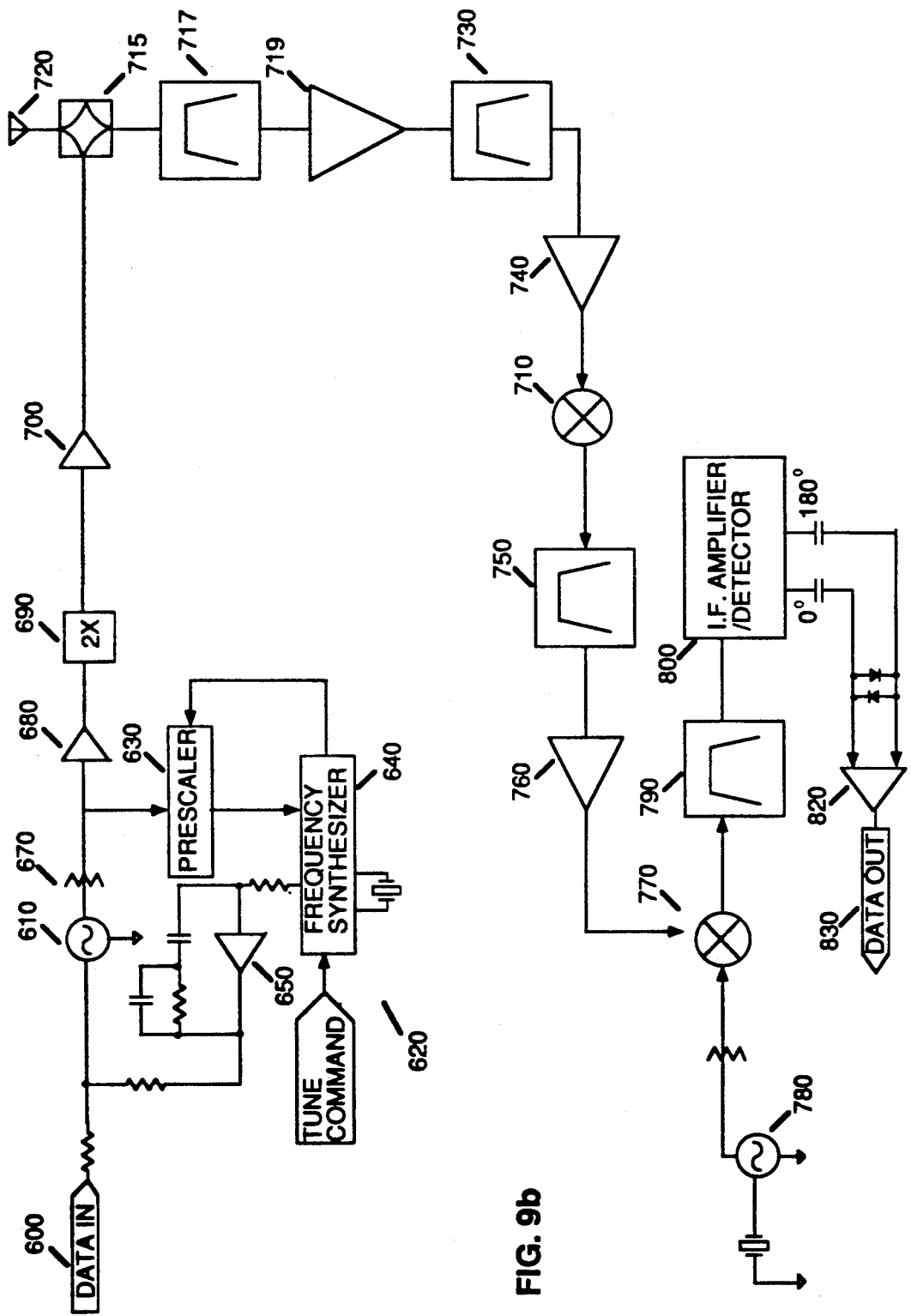
Figure 9C:
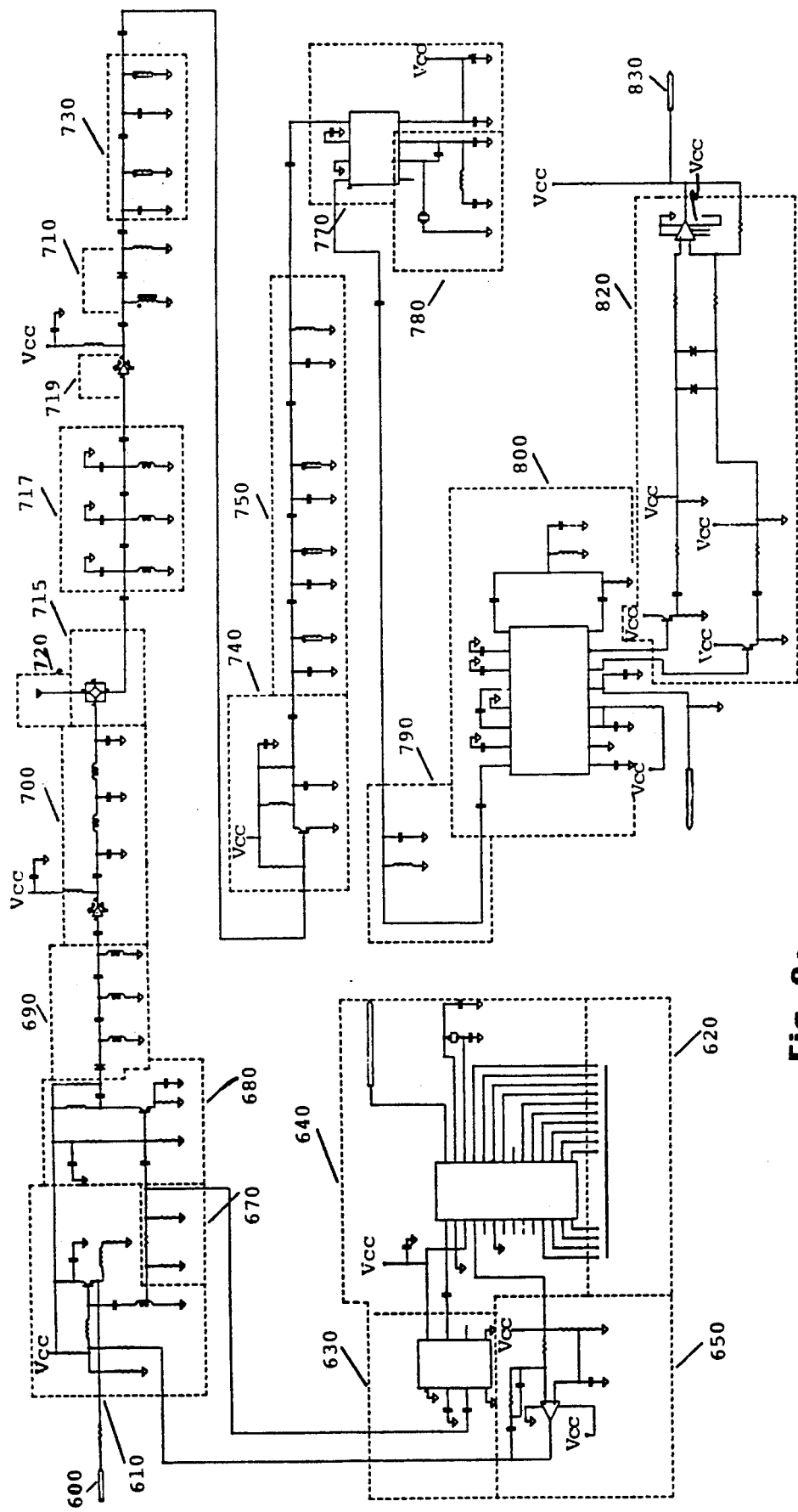

Alternatively, further signal preselection and amplification may be employed to enhance the sensitivity of the receiver. This is illustrated by the block diagram of FIG. 9b and the corresponding circuit diagram of FIG. 9c. FIGS. 9b and 9c illustrate a receiver device similar to that illustrated by FIG. 9a, except that a second filter 717 and amplifier 719 have been added to provide further preselection by elimination of the image frequency prior to input to the mixer and increased sensitivity through the use of multiple filters and amplifiers. The signal frequencies to be processed may be more precisely detected and processed and elimination of extraneous signals may be more closely controlled.

Figure 10A:
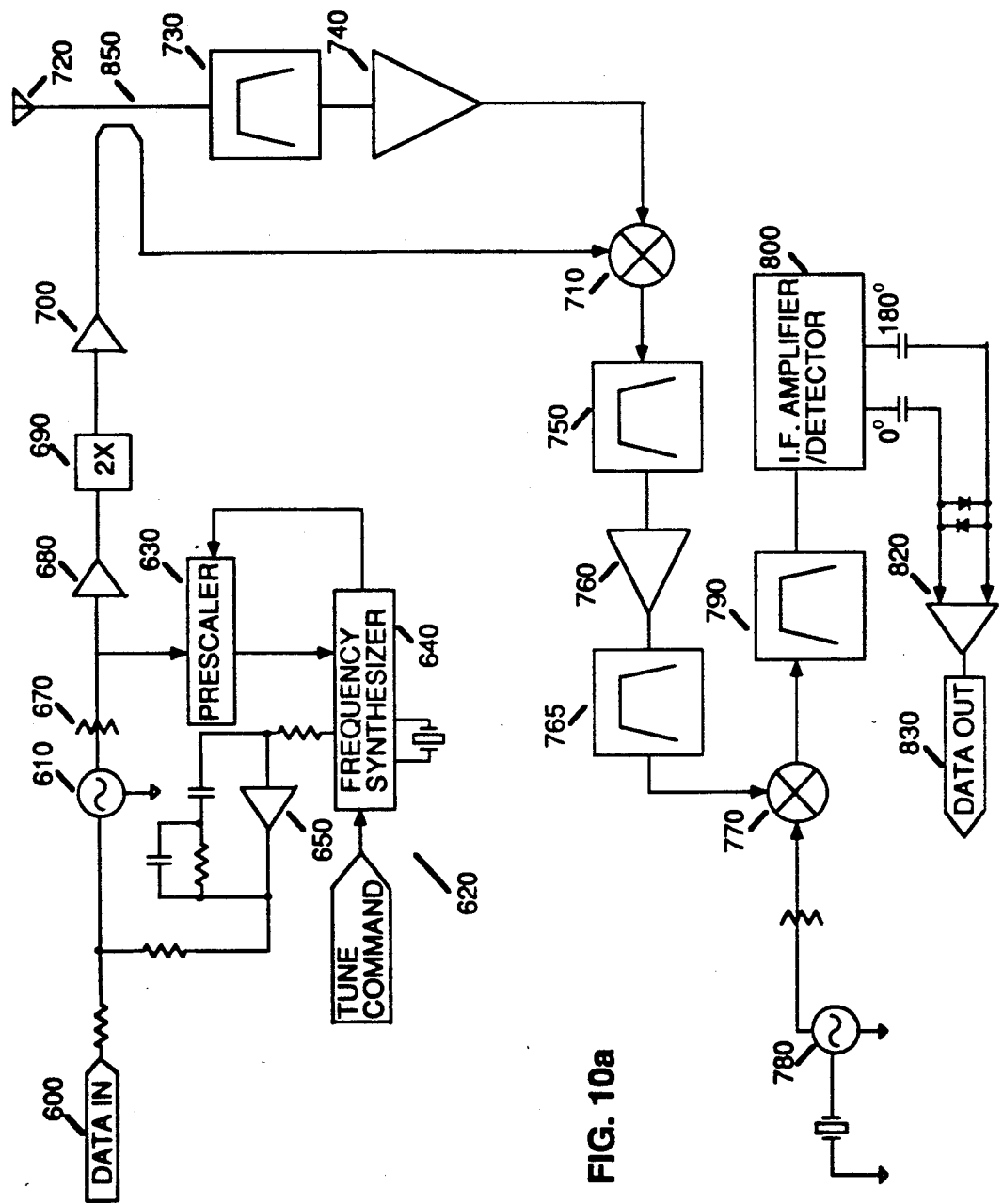
FIGS. 10a and 10b illustrate a second exemplary improved proximal cable-less communication system of the present invention.
Figure 10B:
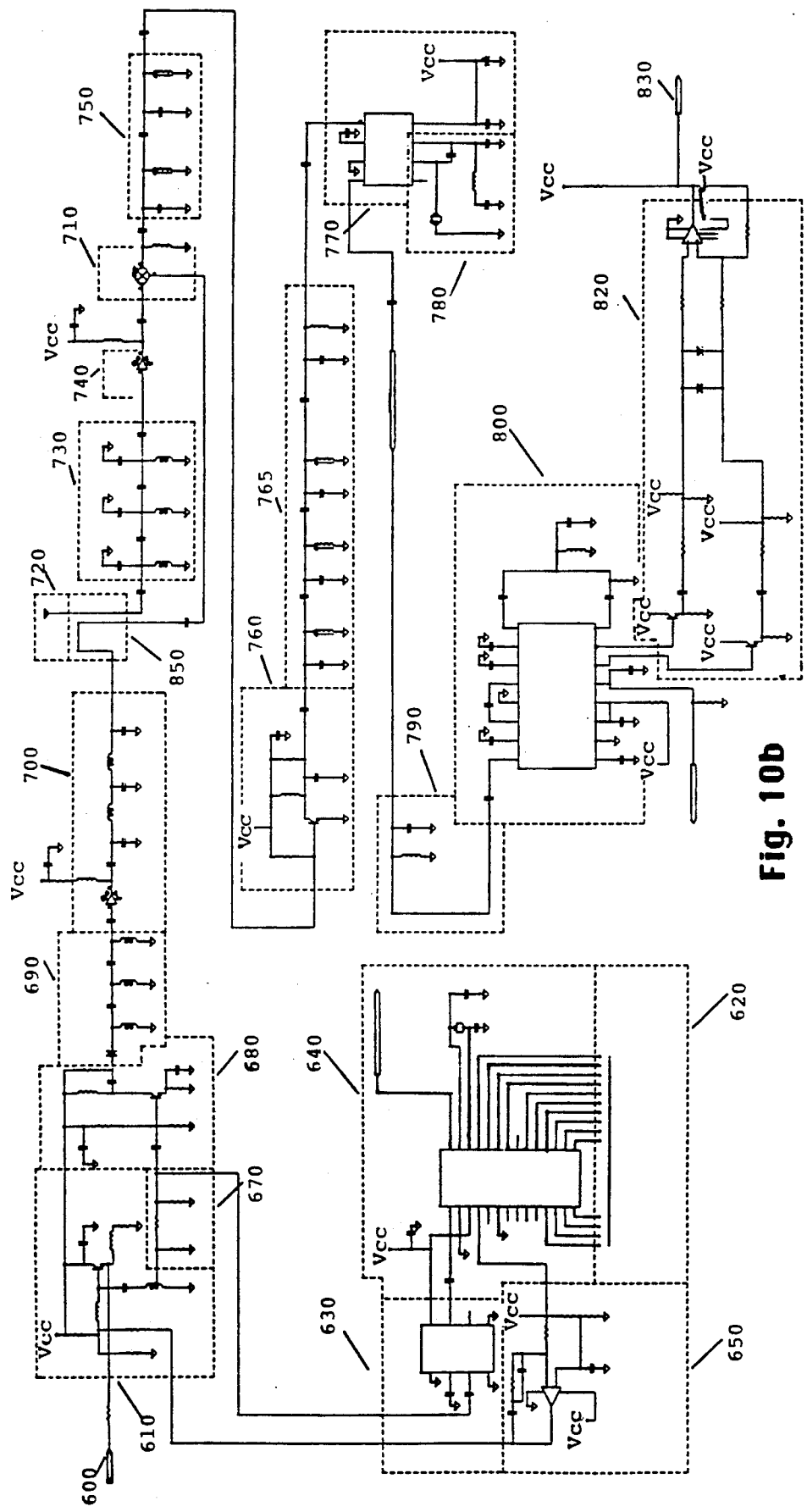

Another embodiment of the proximal cable-less communication system of the present invention is illustrated by the block diagram of FIG. 10a and the corresponding circuit diagram of FIG. 10b. In this embodiment, the output of amplifier 700 is input directly to the mixer 710. However, the electrical interconnect between amplifier 700 and mixer 710 is deliberately increased in length and routed along a predetermined path in order to increase the effectiveness of radiation of the signal generated by local oscillator 610. The electrical interconnect is deliberately routed to run parallel with the electrical interconnect that connects antenna 720 with filter 730 for such a distance that inductive coupling occurs and the signal traveling along the electrical interconnect from the amplifier 700 to the mixer 710 induces a signal, at the point where the two electrical interconnects are parallel 850, onto the electrical interconnect connecting antenna 720 and filter 730, wherein the induced signal travels to antenna 720.

In the present embodiment, the signal generated by the local oscillator 610 is input directly into the mixer 710, that is, the signal generated by the local oscillator 610 is not input to the mixer 710 via the same signal line which inputs the received signal to the mixer 710. The bandpass filter 730 may then be configured to pass only those signals at the predetermined frequency of the receiving signal, eliminating signals at other frequencies, including signals at the frequency of the local oscillator (thereby eliminating front end overload).

The devices illustrated by FIGS. 9 and 10 are preferably operated in a half duplex manner wherein oscillator 610 is modulated according to the data input 600 during a first time period to radiate signals which are subsequently detected by a second receiver device. During a second time period, the local oscillator 610 is not modulated and signals containing information radiated by a second receiver device are detected and received through antenna 720.

Figure 11A:
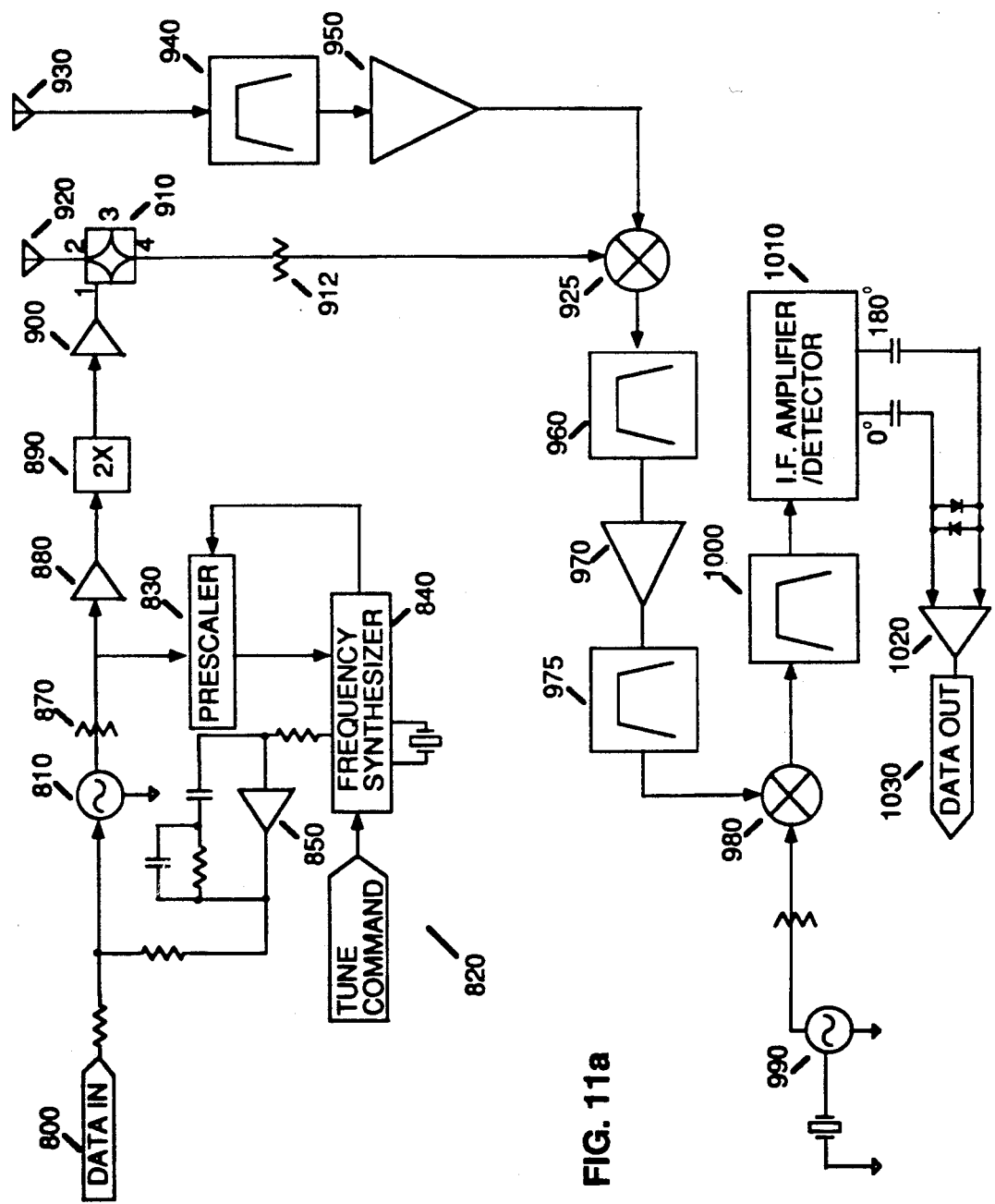
FIGS. 11a and 11b illustrate a third exemplary improved proximal cable-less communication system of the present invention.
Figure 11B:
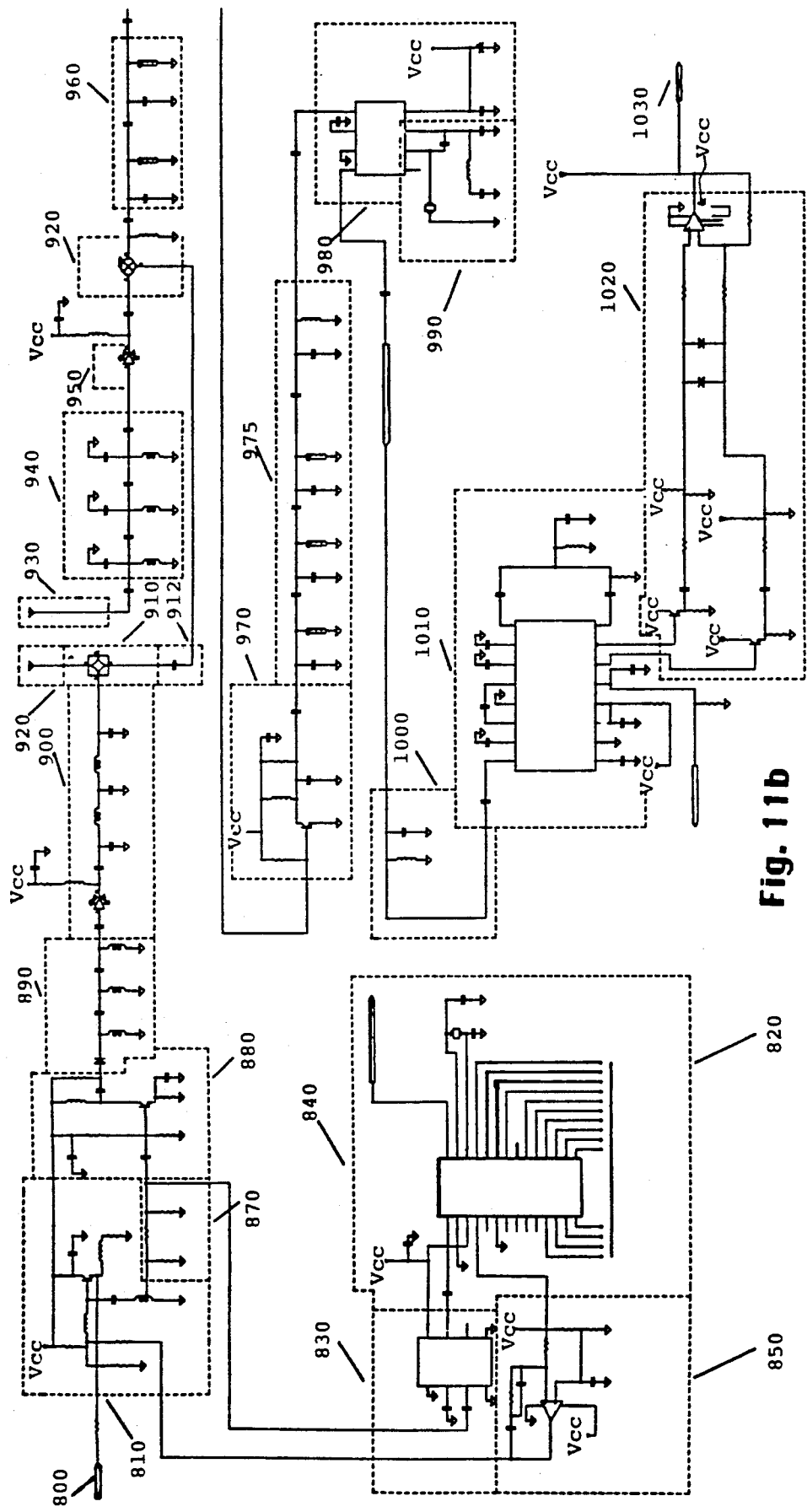

A receiver with a separate antenna feed is illustrated by the block diagram of FIG. 11a and the corresponding circuit diagram of FIG. 11b. The signal generated by local oscillator 810, is modulated according to the data input 800 at a frequency controlled by the frequency synthesizer circuit 820. The output of local oscillator 810 is input to an attenuator 870, amplifier 880, frequency doubler 890 and amplifier 900. The output of amplifier 900 is input to a hybrid directional coupler 910 which produces the signal at two outputs of the coupler. The signal is output to antenna 920 which radiates the signal, and the signal is output to mixer 925 preferably through an attenuator 912. Signals radiated by a second receiving device similarly configured are detected and received by antenna 930. The signals received through antenna 930 are input to band pass filter 940 to eliminate signals at frequencies outside the frequency of the received signal including any signals generated by local oscillator 810. This signal is then input to amplifier 950 which amplifies the amplitude thereby increasing the sensitivity of the receiver device. The mixer 920 is a balanced mixer which generates the sum and difference frequencies of the two input frequencies. The output of mixer 920 is input to filter 960 which filters out the frequencies resulting from the sum of the two input signals to the mixer and passes the difference frequency also referred to as the intermediate frequency.

The signals output from filter 960 are input to amplifier 970 and then to a second filter 975 before being input to a second mixer 980. The second input to mixer 980 is a signal generated by local oscillator 990 which preferably is tuned to a frequency which causes a difference frequency at the output of the mixer to be generated which is in frequency range acceptable to and can be received by the IF amplifier/detector 1010. For example, if the local oscillator 810 generates a signal at the frequency 1.2 GHz, which is subsequently doubled to 2.4 MHz by frequency doubler 890, and the local oscillator of the second received device generates a signal at 2.9 GHz, the output signal after filter 960 would be at a frequency of 50 MHz. The second local oscillator 990 is set to generate signals at 48.5 MHz. Thus the intermediate frequency output from mixer 980 and filter 990 would be 1.5 MHz, a signal frequency which can be processed by intermediate frequency amplifier/detector 1010 and comparator circuit 1020.

The signals output by mixer 980 are signals at the intermediate frequency encoded with the information radiated by the second receiver device. The signals are input to a second band pass filter 1000 which similarly removes the frequencies which result due to the sum of the two input signals to the mixer 980. The filtered signals are then input into intermediate frequency amplifier/detector 1010 which, in conjunction with comparator circuit 1020, generates the data output 1030. By using the separate antenna, a more effective use is made of the local oscillator signal, thereby enhancing the robustness of the signal.

Throughout the structure of the present invention, more substantial levels of local oscillator power may be used, such as those required to inject passive mixers to further enhance system robustness. The local oscillator could optionally simply be increased in power while maintaining the specifications for the receiver and attenuating the local oscillator signal to an acceptable power level at the mixer.

Figure 12A:
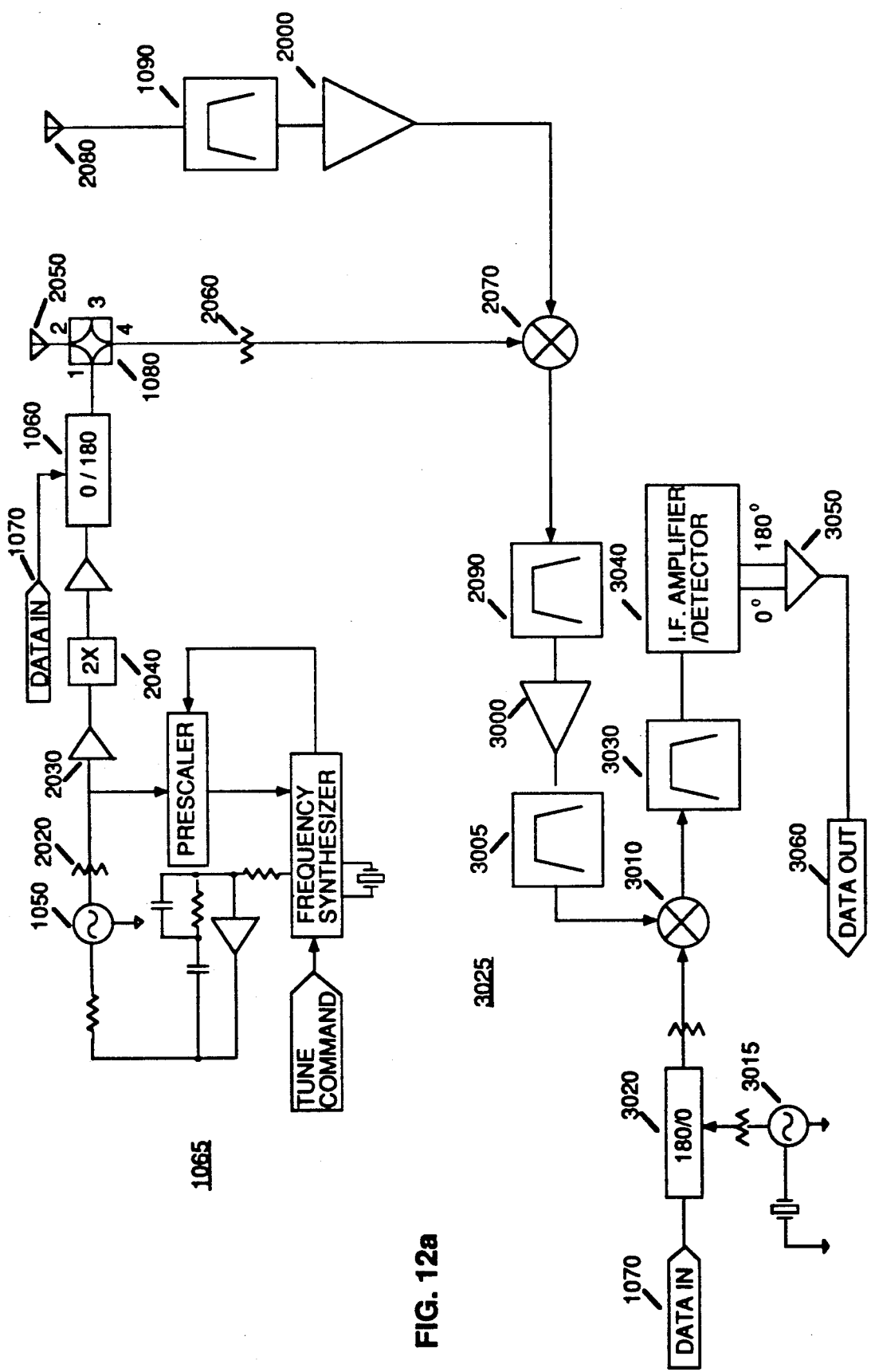
FIGS. 12a and 12b illustrate a fourth exemplary improved proximal cable-less communication system of the present invention.
Figure 12B:
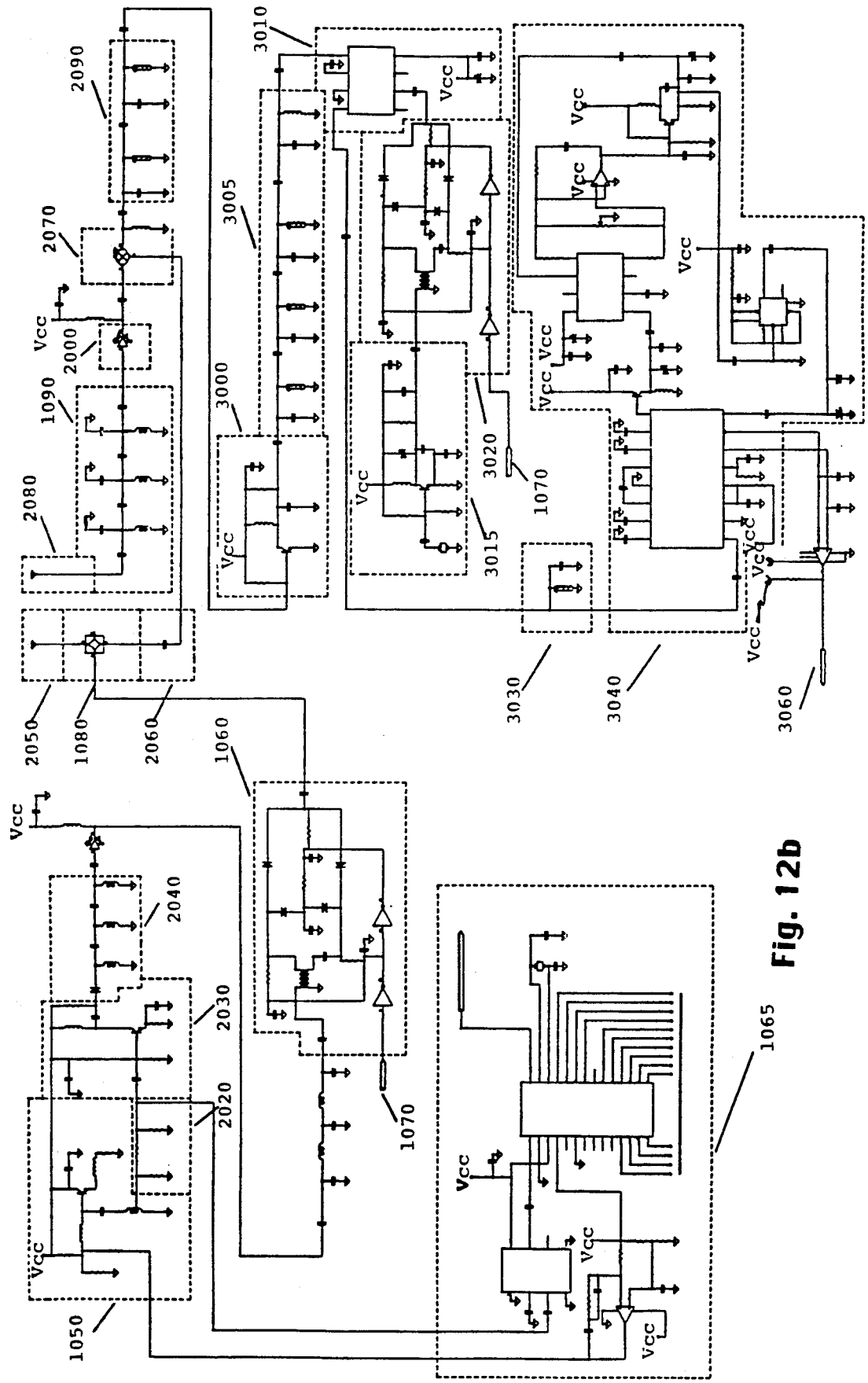

A full duplex digital system is shown in the block diagram of FIG. 12a and the corresponding circuit diagram of FIG. 12b. The local oscillator 1050 for the receiver generates signals at a frequency controlled by frequency synthesizer circuit 1065. The signals are attenuated by attenuator 2020 and amplified by amplifier 2030 and doubled in frequency by frequency multiplier 2040. The frequency multiplier 2040 may or may not be implemented depending upon the desired output frequency and the frequency range of the local oscillator.

The data input 1070 is sent through a 0/180 phase shift circuit 1060 which will cause, for example, an input of 0 to be shifted at 0° and an input of 1 to be shifted 180° in phase. The shifted local oscillator signal is then sent through a coupling circuit or network 1080 which splits the signal and outputs a portion of the signal to antenna 2050 for radiating the signal and also to attenuator 2060 and mixer 2070 of the receiver. The mixer 2070 produces signals which contain both the phase shift from its own local oscillator/data input circuit 1050, 1060 and 1070 and the received signal with its phase shift representing the data to be decoded.

The received signals are detected and received by antenna 2080 and are processed through incoming receiving filter 1090 and amplifier 2000. The output of the balanced mixer 2070 are signals at the sum and the difference frequencies of the two input signals. The output of the mixer 2070 is then passed through a filter 2090, which eliminates the signals at the frequency which are the sum of the frequencies of the two signals and outputs those signals at the intermediate frequency through amplifier 3000 and filter 3005 to a second mixer 3010.

The other input to the second mixer 3010 consists of a second phase shift circuit controlled by the same common data input 1070 as the phase shift circuit 1060. The phase shift circuit 3020 provides an opposing phase shift to the signals generated by the local oscillator 3015; namely, a 0 input causes a 180° shift in the output and an input value of one causes a 0° shift. This inversely phase shifted signal is combined with the intermediate frequency output by the second mixer 3010, wherein the inversely phase shifted signal effectively cancels the phase shifted local oscillator signal present at the other input of the mixer 3010. The result is that the output of the second mixer now contains only the desired signal received from the second receiver device without any kind of sidetone and thus contamination to the same.

This output of the mixer 3010 is input to an intermediate frequency filter 3030 which filters all but the desired frequencies containing the information to be detected by the IF amplifier/detector 3040. The output of the filter 3030 is input to IF amplifier/detector 3040 which, in conjunction with comparator 3050, detects the data encoded in the signal and outputs the data as data output 3060.

Through this embodiment, the one effect of a full duplex system, namely side tone, which tends to affect the state of the signal and corrupts the information encoded thereon, is eliminated resulting in a more accurate and dependable reception of information.

Figure 13A:
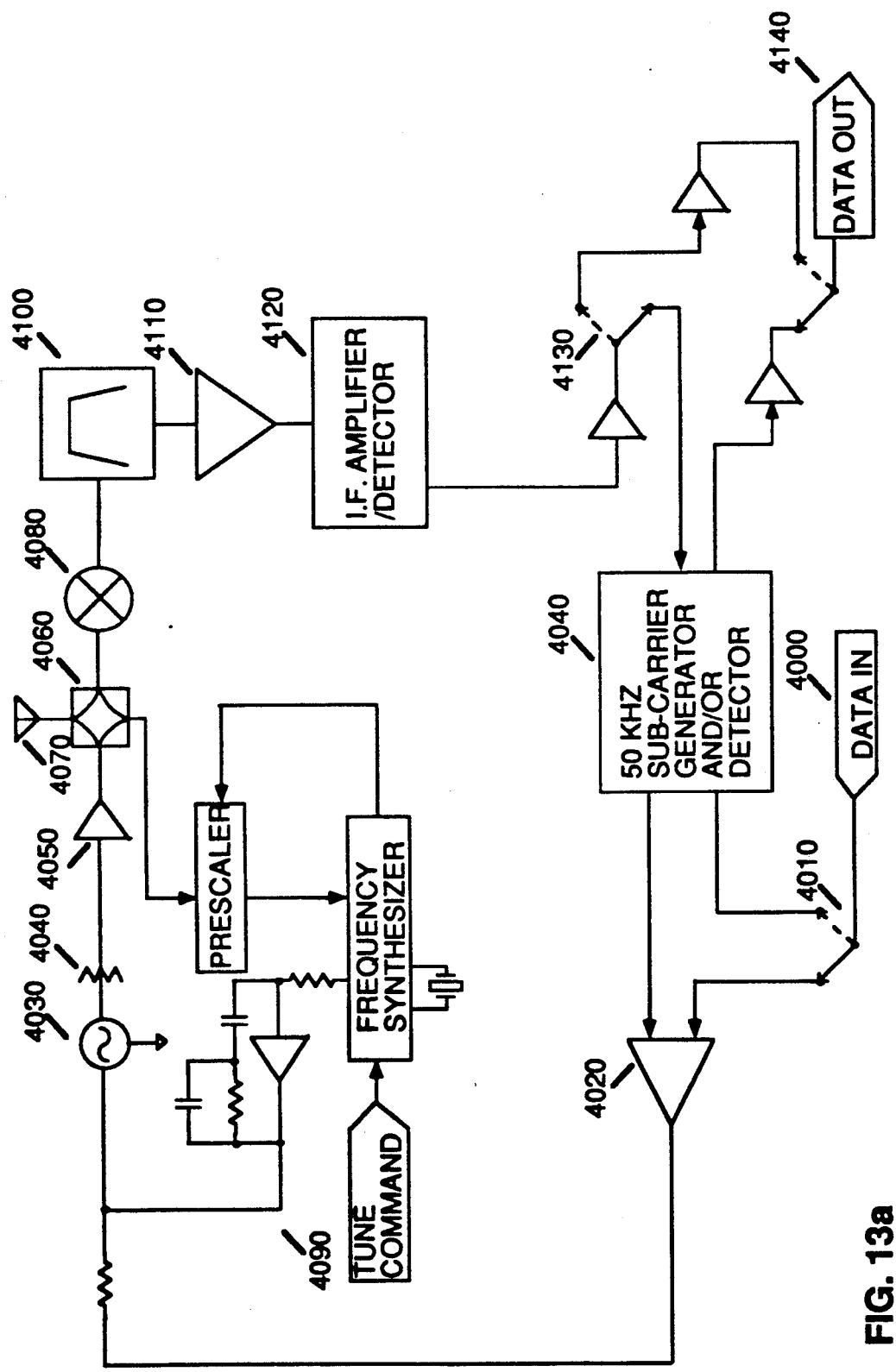
FIGS. 13a and 13b illustrate a fifth exemplary improved proximal cable-less communication system of the present invention.
Figure 13B:
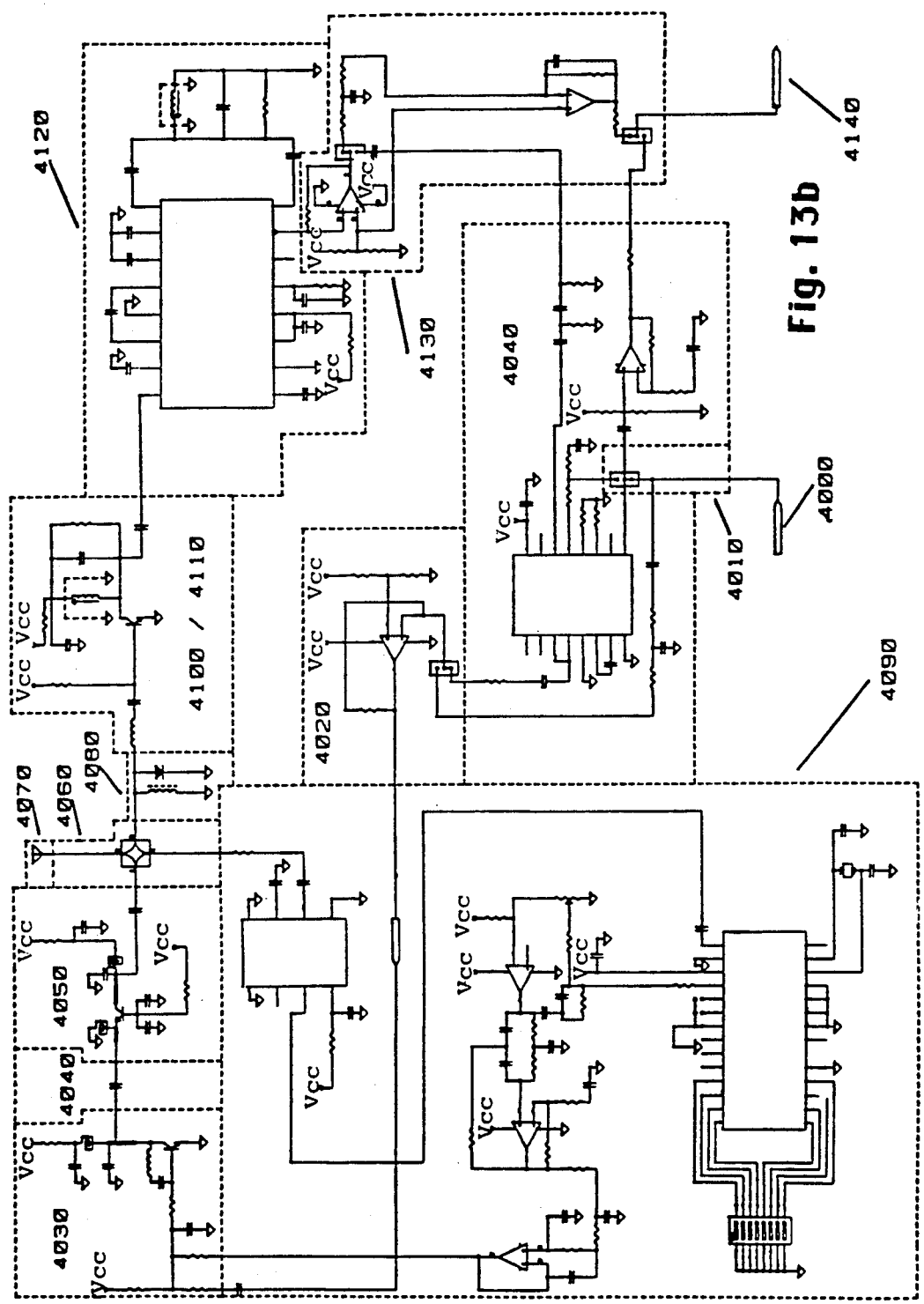

A receiver device using baseband and subcarrier signals to eliminate sidetone are illustrated by FIGS. 13a and 13b. If the data to be encoded is encoded into the baseband, the data input 4000 is input through switch 4010, amplifier 4020 to local oscillator 4030. If the data input 4000 is to be encoded into the subcarrier, the switch 4010 is connected to the input of subcarrier generator/detector 4040. The subcarrier generator and/or detector 4040 generates and encodes the input into the subcarrier and outputs the subcarrier to amplifier 4020 to local oscillator 4030.

The output from mixer 4030 is input to attenuator 4040, amplifier 4050 and hybrid directional coupler 4060 which, in the present example, directs the signal out to antenna 4070, to mixer 4080 and to frequency synthesizer circuit 4090 for feedback and control of the local oscillator 4030.

The signals are received through antenna 4070 and input to mixer 4080 through hybrid directional coupler 4060. Mixer 4080 is an unbalanced mixer, preferably a diode, which mixes signals received through antenna 4070 and signals generated by local oscillator 4050.

The output of mixer 4080 is filtered by filter 4100 to eliminate all but those signals at the intermediate frequency and amplified by amplifier 4110 to provide increased sensitivity.

The signals output by amplifier 4110 are input to IF amplifier/detector 4120 which detects the modulation of the signal at the intermediate frequency and generates an output signal which comprises the information encoded and radiated by the second receiver device. If the information was encoded into the baseband, the switch 4130 is positioned to direct the signal to the output 4140. If the information was encoded into the subcarrier, the output of IF amplifier/detector 4120 is directed, via switch 4130, to the subcarrier generator and/or detector 4040 which detects the subcarrier information and outputs the output data to the output 4140.

By using the baseband and subcarrier to receive or radiate modulated signals, corruption due to sidetone is eliminated because the information being radiated, for example, through the baseband, is ignored when detecting and decoding information encoded into the alternate means, in the present illustration, the subcarrier.

The invention has been described in conjunction with the preferred embodiment. Numerous alternatives, modifications, variations and uses will be apparent to those skilled in the art in light of the foregoing description.

We claim:

1. In a proximal, cable-less communication system comprising at least two receivers spaced a proximal distance apart, each receiver comprising an antenna for receiving an incoming signal, a mixer coupled to the antenna, a local oscillator coupled to the mixer which generates an oscillating signal at a predetermined frequency, wherein the mixer generates a signal at the difference frequency of the incoming signal and the oscillating signal, the local oscillator of the first receiver being modulated to provide the incoming signal to the second receiver and the local oscillator of the second receiver being modulated to provide the incoming signal to the first receiver, such that each receiver receives the leakage radiation of the modulated local oscillator signal of the other receiver and information transfer is achieved by reception of the incoming signals, an improved proximal cable-less communication system, each of said receivers comprising:

a hybrid directional coupler acting as an intentional signal path and having a first, second, third and fourth input/output ports, said coupler receiving as a first input through the first port a signal received from the other receiver, the first input being output through the third port to the mixer, said coupler receiving as a second input through the fourth port the signal generated by the local oscillator of the, the second input being output to the antenna through the first port and to the mixer through the third port;

whereby the primary function of the local oscillator signal to provide input to the mixer to generate the intermediate frequency is maintained, the effectiveness of radiation is increased and the distance the receivers are spaced apart can be increased.

2. In a proximal, cable-less communication system comprising of at least two receivers spaced a proximal distance apart, each receiver comprising an antenna for receiving an incoming signal, a mixer coupled to the antenna, a local oscillator coupled to the mixer which generates an oscillating signal at a predetermined frequency, wherein the mixer generates a signal at the difference frequency of the incoming signal and the oscillating signal, the local oscillator of the first receiver being modulated to provide the incoming signal to the second receiver and the local oscillator of the second receiver being modulated to provide the incoming signal to the first receiver, such that each receiver receives the leakage radiation of the modulated local oscillator signal of the other receiver and information transfer is achieved by reception of the incoming signals, an improved proximal cable-less communication comprising:

an extended length signal transmission line which couples the local oscillator to the mixer whereby the signal transmission line provides opportunity along the length of the signal transmission line for the leakage radiation to occur, and the primary function of the local oscillator signal to provide input to the mixer to generate the intermediate frequency is maintained, the effectiveness of radiation is increased and the distance the receivers are spaced apart can be increased;

said extended length signal transmission line being a minimum length of one-tenth of a signal wave length, and the distance the signal transmission lines are separated by at least 0.1 inches, so that inductive coupling occurs and the signal generated by the local oscillator on the extended length transmission line is generated on the signal transmission line which couples the antenna and the mixer.

3. The proximal, cableless communication system as described in claim 2, wherein the length of the extended length signal transmission line is located to lie parallel with a signal transmission line which couples the antenna and the mixer, the length of the signal transmission lines being long enough and the distance the signal transmission lines are separated being short enough such that inductive coupling occurs and the signal generated by the local oscillator on the extended length transmission line is generated on the signal transmission line which couples the antenna and the mixer, whereby the signal generated by the local oscillator is output to the antenna for output thereby increasing the effectiveness of radiation of the signal.

4. The proximal, cable-less communication system as described in claim 3, wherein the minimum length of the signal transmission lines is one-tenth of the signal wave length.

5. The proximal, cable-less communication system as described in claim 3, wherein the spacing between the signal transmission lines is 0.1 inches.

6. The proximal, cable-less communication system as described in claim 3, wherein the signal is at a frequency of 2.4 GHz, the signal transmissions lines are parallel for a distance of 0.5 inches and the spacing between the signal transmission lines is 0.1 inches.

7. In a proximal, cable-less communication system comprising of at least two receivers spaced a proximal distance apart, each receiver comprising a first antenna for receiving an incoming signal, a mixer coupled to the first antenna, a local oscillator coupled to the mixer which generates an oscillating signal at a predetermined frequency, wherein the mixer generates a signal at the difference frequency of the incoming signal and the oscillating signal, the local oscillator of the first receiver being modulated to provide the incoming signal to the second receiver and the local oscillator of the second receiver being modulated to provide the incoming signal to the first receiver, such that each receiver receives the leakage radiation of the modulated local oscillator signal of the other receiver and information transfer is achieved by reception of the incoming signals, an improved proximal cable-less communication system, each of said receivers comprising:

a second antenna for radiating the signal generated by the local oscillator;

means for splitting the local oscillator signal generated by the local oscillator to be output to a second antenna, separate from the first antenna which receives the incoming signal, while concurrently providing the local oscillator signal as input to the mixer;

whereby the primary function of the local oscillator signal to provide input to the mixer to generate the intermediate frequency is maintained, the effectiveness of radiation is increased and the distance the receivers are spaced apart can be increased.

8. The proximal, cable-less communication system as described in claim 7, wherein said means for causing the signal generated by the local oscillator to be output to the second antenna comprises a signal splitter which splits the signal generated by the local oscillator between the mixer and the second antenna.

9. The proximal, cable-less communication system as described in claim 7, wherein said first and second antennae are located a distance apart to decrease the effect of the signal generated by the local oscillator on the signals received through the first antenna.

10. The proximal, cable-less communication system as described in claim 9 wherein the first and second antennae are spaced apart a minimum distance of one-half the wavelength of the signal generated by the local oscillator.

11. The proximal, cable-less communication system as described in claim 10, wherein the signal generated by the local oscillator is at a frequency of 2.4 GHz and the first and second antennae are spaced apart a minimum distance of 2.4 inches.

12. The proximal, cable-less communication system as described in claim 7, wherein the first antenna is at a polarization different from the second antenna.

13. The proximal, cable-less communication system as described in claim 12, wherein the first antenna is horizontally polarized and the second antenna is vertically polarized.

14. The proximal, cable-less communication system as described in claim 7, wherein the first and second antenna are of different lengths, the second antenna being longer than the first antenna to more efficiently radiate signals generated by the local oscillator.

15. The proximal, cable-less communication system as described in claim 7, wherein the first and second antennae are located to be co-linear to one another.

16. The proximal, cable-less communication system as described in claim 7, wherein the first antenna is tuned to the frequency of the received signal and the second antenna is tuned to the frequency of the signal generated by the local oscillator.

17. In a proximal, cable-less communication system comprising of at least two receivers spaced a proximal distance apart, each receiver comprising a horizontally polarized first antenna for receiving an incoming signal, a mixer coupled to the first antenna, a local oscillator coupled to said mixer which generates an oscillating signal at a predetermined frequency, wherein said mixer generates a signal at the difference frequency of the incoming signal and the oscillating signal, the local oscillator of the first receiver being modulated to provide the incoming signal to the second receiver and the local oscillator of said second receiver being modulated to provide the incoming signal to said first receiver, such that each receiver receives the leakage radiation of the modulated local oscillator signal of the other receiver and information transfer is achieved by reception of the incoming signals, an improved proximal cable-less communication system, each of said receivers comprising:
- a vertically polarized second antenna for radiating the signal generated by the local oscillator;
- a signal splitter which splits the local oscillator signal generated by the local oscillator between the mixer and the second antenna, separate from the horizontally polarized first antenna which receives the incoming signal by a minimum distance of one-half the wavelength of the signal generated by the local oscillator, while providing the local oscillator signal as input to the mixer;
- whereby the primary function of the local oscillator signal to provide input to the mixer to generate the intermediate frequency is maintained, the effectiveness of radiation is increased and the distance the receivers are spaced apart can be increased.

18. The proximal, cable-less communication system as described in claim 17, wherein the first and second antenna are of different lengths, the second antenna being longer than the first antenna to more efficiently radiate signals generated by the local oscillator.

19. The proximal, cable-less communication system as described in claim 17, wherein the first and second antenna are located to be co-linear to one another.

20. The proximal, cable-less communication system as described in claim 17, wherein the first antenna is tuned to the frequency of the received signal and the second antenna is tuned to the frequency of the signal generated by the local oscillator.

21. In a proximal, cable-less communication system comprising of at least two receivers spaced a proximal distance apart, each receiver comprising an antenna for receiving an incoming signal, a mixer coupled to the antenna, a local oscillator coupled to the mixer which generates an oscillating signal at a predetermined frequency, wherein the mixer generates a signal at the difference frequency of the incoming signal and the oscillating signal, the local oscillator of the first receiver being modulated to provide the incoming signal to the second receiver and the local oscillator of the second receiver being modulated to provide the incoming signal to the first receiver, such that each receiver receives the leakage radiation of the modulated local oscillator signal of the other receiver and information transfer is achieved by reception of the incoming signals, an improved proximal cable-less communication system, each of said receivers comprising:
- an extended length signal transmission line which couples the local oscillator to the mixer lies parallel with a signal transmission line which couples the antenna and the mixer, the length of the signal transmission lines being a minimum length of one-tenth of a signal wave length, and the distance the signal transmission lines are separated by at least 0.1 inches, so that inductive coupling occurs and the signal generated by the local oscillator on the extended length transmission line is generated on the signal transmission line which couples the antenna and the mixer;
- whereby the signal generated by the local oscillator is output to the antenna for output thereby increasing the effectiveness of radiation of the signal and the spacial distance between the receivers.

* * * * *